United States Patent
Lu et al.

(10) Patent No.: US 12,322,037 B2
(45) Date of Patent: Jun. 3, 2025

(54) SYSTEM AND METHOD FOR REAL-TIME RAY TRACING IN A 3D ENVIRONMENT

(71) Applicant: InterDigital CE Patent Holdings, SAS, Paris (FR)

(72) Inventors: Heqi Lu, Bordeaux (FR); Patrice Hirtzlin, Betton (FR); Francois-Louis Tariolle, Liffre (FR); Merwan Achibet, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 146 days.

(21) Appl. No.: 17/909,016

(22) PCT Filed: Mar. 15, 2021

(86) PCT No.: PCT/EP2021/056551
§ 371 (c)(1),
(2) Date: Sep. 2, 2022

(87) PCT Pub. No.: WO2021/185771
PCT Pub. Date: Sep. 23, 2021

(65) Prior Publication Data
US 2023/0090732 A1      Mar. 23, 2023

(30) Foreign Application Priority Data

Mar. 17, 2020  (EP) .................................. 20305276
Sep. 2, 2020   (EP) .................................. 20305970

(51) Int. Cl.
G06T 15/50       (2011.01)
G06T 7/12        (2017.01)
(Continued)

(52) U.S. Cl.
CPC ............ G06T 15/506 (2013.01); G06T 7/12 (2017.01); G06T 7/90 (2017.01); G06T 15/06 (2013.01);
(Continued)

(58) Field of Classification Search
CPC ........... G06T 7/12; G06T 7/90; G06T 15/506; G06T 2207/10021; G06T 2207/10024;
(Continued)

(56) References Cited

U.S. PATENT DOCUMENTS 9,390,315 B1 *   7/2016   Yalniz ..................... G06T 7/90
2003/0052891 A1  3/2003   Bragg et al.
(Continued)

FOREIGN PATENT DOCUMENTS

CN   110930497 B   5/2020
EP   3343443 A1    7/2018
GB   2535792 A     8/2016

*Primary Examiner* — Phi Hoang
(74) *Attorney, Agent, or Firm* — Flaster Greenberg P.C.

(57) ABSTRACT

A method and a system for rendering a 3D scene are disclosed. A set of parameters for objects in the 3D scene are identified. The objects are grouped based on the identified set of parameters and spatial boundaries for an intermediate structure group of objects based on an object type is determined. An illumination contribution for each plane of the spatial boundary of the intermediate structure is determined for the objects in the 3D scene. The 3D scene is then rendered based on the determined spatial boundary and the illumination contribution of the intermediate structure for each object in the scene.

20 Claims, 31 Drawing Sheets

(51) Int. Cl.
*G06T 7/90* (2017.01)
*G06T 15/06* (2011.01)

(52) U.S. Cl.
CPC ............... *G06T 2207/10021* (2013.01); *G06T 2207/10024* (2013.01); *G06T 2207/20021* (2013.01); *G06T 2210/12* (2013.01)

(58) Field of Classification Search
CPC ........... G06T 15/06; G06T 2207/20021; G06T 2210/12; G06T 19/006; G06T 15/04
See application file for complete search history.

(56) References Cited

U.S. PATENT DOCUMENTS

| | | | |
|---|---|---|---|
| 2015/0262407 A1 | 9/2015 | Fursund et al. | |
| 2017/0358123 A1* | 12/2017 | Novak | G06T 15/50 |
| 2018/0033191 A1* | 2/2018 | Mendez | G06T 15/506 |
| 2019/0102935 A1 | 4/2019 | Neulander | |
| 2020/0051318 A1* | 2/2020 | Muthler | G06T 15/06 |

* cited by examiner

SYSTEM AND METHOD FOR REAL-TIME RAY TRACING IN A 3D ENVIRONMENT

CROSS-REFERENCE TO RELATED APPLICATIONS

This application is the 371 National Stage of International Application No. PCT/EP2021/056551, filed Mar. 15, 2021, which claims priority to European Patent Application No. 20305276.6, filed Mar. 17, 2020, and European Application No. 20305970.4, filed Sep. 2, 2020, the disclosures of which are incorporated herein by reference in their entireties.

TECHNICAL FIELD

The present disclosure generally relates to augmented reality (AR) applications. At least one embodiment relates to the placement of virtual objects in a video, such as, for example, a live-video feed of a 3D environment.

BACKGROUND

Traditionally, ray tracing is a technique used for high quality non-real time graphics rendering tasks, such as production of animated movies, or producing 2D images that more faithfully model behavior of light in different materials. As an example, ray tracing is particularly suited for introducing lighting effects into rendered images. Sources of light may be defined for a scene which cast light onto objects in the scene. Some objects may occlude other objects from light sources resulting in shadows in the scene. Rendering using a ray tracing technique allows the effects of light sources to be rendered accurately since ray tracing is adapted to model the behavior of light in the scene.

Ray tracing rendering techniques are often relatively computationally expensive and memory intensive to implement, particularly if the rendering is desired to be performed in real-time. Additionally, for non-planar, glossy or refractive objects, significant errors may be introduced into a scene based on obtained color information for such ray traced objects. As such, ray tracing techniques are difficult to implement on devices like mobile phones, tablets, AR glasses for display and embedded cameras for video capture. The embodiments herein have been devised with the foregoing in mind.

SUMMARY

The disclosure is directed to a method for rendering a 3D scene of a video, for example, a live-video feed. The method may take into account implementation on devices such as, for example mobile phones, tablets, AR glasses for display and embedded cameras for video capture.

According to a first aspect of the disclosure, there is provided a method for rendering a 3D scene of a video, comprising:
identifying a set of parameters for one or more objects in the 3D scene of the video;
grouping the one or more objects based on the identified set of parameters for each of said one or more objects in the 3D scene of said video;
determining a spatial boundary of an intermediate structure for each grouping of the one or more objects in the 3D scene based on an object type;
determining an illumination contribution for each plane of the spatial boundary of the intermediate structure for each grouping of the one or more objects in the 3D scene; and
rendering said 3D scene of the video based on the determined spatial boundary and the determined illumination contribution for each plane of the spatial boundary of the intermediate structure for each grouping of the one or more objects in the 3D scene.

The general principle of the proposed solution relates to lighting effects, such as, reflection of objects, refraction and shadowing which are incorporated into the rendered images. High-quality reflection of virtual objects on real objects are obtained by considering the real object material parameters, such as, for example, surface roughness, and index of refraction (for refractive objects such as glasses). Additionally, consistent lighting of virtual objects with real lighting, as well as casting of corresponding shadows on real objects is considered.

In an embodiment, the illumination contribution is determined by determining a visibility for each plane of said spatial boundary for emissive objects; and determining color information for each plane of said spatial boundary for non-emissive objects.

In an embodiment, rendering of the 3D scene further comprises determining color information for said intermediate structures of a camera.

In an embodiment, the one or more objects include at least one of a real object and a virtual object.

In an embodiment, the set of parameters include at least one of object planarity, object refractivity and object importance in the 3D scene of the video.

In an embodiment, an area for each object of said one or more objects in the 3D scene of said video is determined. The determined area defines a bounding shape for each of the one or more objects.

In an embodiment, the object type is one of a light, a camera, or other object.

In an embodiment, the other object is one of a planar object and a nonplanar object.

In an embodiment, the spatial boundary of the intermediate structure is subdivided.

In an embodiment, the spatial boundary of the intermediate structure for the light is a plane or a set of planes.

In an embodiment, the spatial boundary of the intermediate structure for the camera is a plane corresponding to z-near.

In an embodiment, the spatial boundary of the intermediate structure for the planar object is a plane corresponding to the planar object.

In an embodiment, the spatial boundary of the intermediate structure for the nonplanar object is a set of planes enclosing the determined area.

In an embodiment, the rendering is performed by ray tracing using at least one of a camera ray, a reflection ray, a refraction ray and a shadow ray.

According to a second aspect of the disclosure, there is provided a system for rendering a 3D scene of a video, the system comprising:
a rendering device; and
at least one processor, configured to:
identify a set of parameters for one or more objects in said 3D scene of said video;
group said one or more objects based on the identified set of parameters for each of said one or more objects in said 3D scene of said video;
determine a spatial boundary of an intermediate structure for each grouping of the one or more objects in the 3D scene based on an object type;

determine an illumination contribution for each plane of said spatial boundary of the intermediate structure for each grouping of the one or more objects in the 3D scene; and render said 3D scene of said video based on said determined spatial boundary and said determined illumination contribution for each plane of said spatial boundary of said intermediate structure for each grouping of the one or more objects in the 3D scene.

In an embodiment, the illumination contribution is determined by determining a visibility for each plane of said spatial boundary for emissive objects; and determining color information for each plane of said spatial boundary for non-emissive objects.

In an embodiment, the 3D scene is rendered by determining color information for the intermediate structures of a camera.

In an embodiment, the one or more objects include at least one of a real object and a virtual object.

In an embodiment, the set of parameters are at least one of object planarity, object refractivity and object importance in the 3D scene of the video.

In an embodiment, an area for each object of said one or more objects in said 3D scene of the video is determined. The determined area defines a bounding shape for each of the one or more objects.

In an embodiment, the object type is one of a light, a camera, or other object.

In an embodiment, the other object is one of a planar object and a nonplanar object.

In an embodiment, the spatial boundary of the intermediate structure is subdivided.

In an embodiment, the spatial boundary of the intermediate structure for the light is a plane or a set of planes.

In an embodiment, the spatial boundary of the intermediate structure for the camera is a plane corresponding to z-near.

In an embodiment, the spatial boundary of the intermediate structure for the planar object is a plane corresponding to the planar object.

In an embodiment, the spatial boundary of the intermediate structure for the nonplanar object is a set of planes corresponding to the determined area.

In an embodiment, the scene is rendered by ray tracing using at least one of a camera ray, a reflection ray, a refraction ray and a shadow ray.

According to a third aspect of the disclosure, there is provided a method for rendering a 3D scene of a video, comprising:

identifying a set of parameters for one or more objects in a 3D scene of a video;

determining intermediate structures for said one or more objects in the 3D scene based on the set of identified parameters;

determining a color contribution for the intermediate structures of each object based on a corresponding substitute object; and providing for rendering said 3D scene of said video based on said determined color contribution of the intermediate structures.

The general principle of this proposed solution relates to the rendering of reflective/glossy and/or refractive objects in a 3D scene of a video. High-quality reflection for general objects is achieved by considering material parameters, such as, for example the surface roughness and metallic surface.

Additionally, high-quality refraction for primitive shapes or procedural objects is achieved by considering the material index of refraction.

In an embodiment, the set of parameters includes at least one of a complexity for the object shape, the object position and/or distance with respect to reflective/refractive objects and an environment importance value.

In an embodiment, the environment importance value is related to a color contribution from objects in the 3D scene.

In an embodiment, the objects include at least one of a real object and a virtual object.

In an embodiment, the color contribution from objects in the 3D scene are carried by reflective rays.

In an embodiment, the color contribution from objects in the 3D scene are carried by reflective rays and refractive rays.

In an embodiment, a selected object in the 3D scene is a source object and wherein non-selected objects in the 3D scene are target objects.

In an embodiment, the corresponding substitute object for the source object has a primitive shape.

In an embodiment, the color contribution based on the corresponding substitute object is determined from virtual camera projection parameters.

In an embodiment, the virtual camera projection parameters include at least one of near plane distance, far plane distance and Field-of-View (FOV) angle.

According to a fourth aspect of the disclosure, there is provided a device for rendering a 3D scene of a video, the device comprising:

at least one processor, configured to:
identify a set of parameters for one or more objects in a 3D scene of a video;
determine intermediate structures for said one or more objects in the 3D scene based on the set of identified parameters;
determine a color contribution for the intermediate structures for each object based on a corresponding substitute object; and
provide for rendering said 3D scene of said video based on said determined color contribution of the intermediate structures.

In an embodiment, the set of parameters includes at least one of a complexity for the object shape, the object position and/or distance with respect to reflective/refractive objects and an environment importance value.

In an embodiment, the environment importance value is related to a color contribution from objects in the 3D scene.

In an embodiment, the objects include at least one of a real object and a virtual object.

In an embodiment, the color contribution from objects in the 3D scene are carried by reflective rays.

In an embodiment, the color contribution from objects in the 3D scene are carried by reflective rays and refractive rays.

In an embodiment, a selected object in the 3D scene is a source object and wherein non-selected objects in the 3D scene are target objects.

In an embodiment, the corresponding substitute object for the source object has a primitive shape.

In an embodiment, the color contribution based on the corresponding substitute object is determined from virtual camera projection parameters.

In an embodiment, the virtual camera projection parameters include at least one of near plane distance, far plane distance and Field-of-View (FOV) angle.

Some processes implemented by elements of the disclosure may be computer implemented. Accordingly, such elements may take the form of an entirely hardware embodiment, an entirely software embodiment (including firmware, resident software, microcode, etc.) or an embodiment combining software and hardware aspects that may all generally be referred to herein as "circuit", "module" or system. Furthermore, such elements may take the form of a computer program product embodied in any tangible medium of expression having computer usable program code embodied in the medium.

Since elements of the disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an, an electrical signal, an optical signal, an acoustic signal, a magnetic signal or an electromagnetic signal, e.g. a microwave or RF signal.

BRIEF DESCRIPTION OF THE DRAWINGS

Other features and advantages of embodiments shall appear from the following description, given by way of indicative and non-exhaustive examples and from the appended drawings, of which.

DETAILED DESCRIPTION

Figure 1:
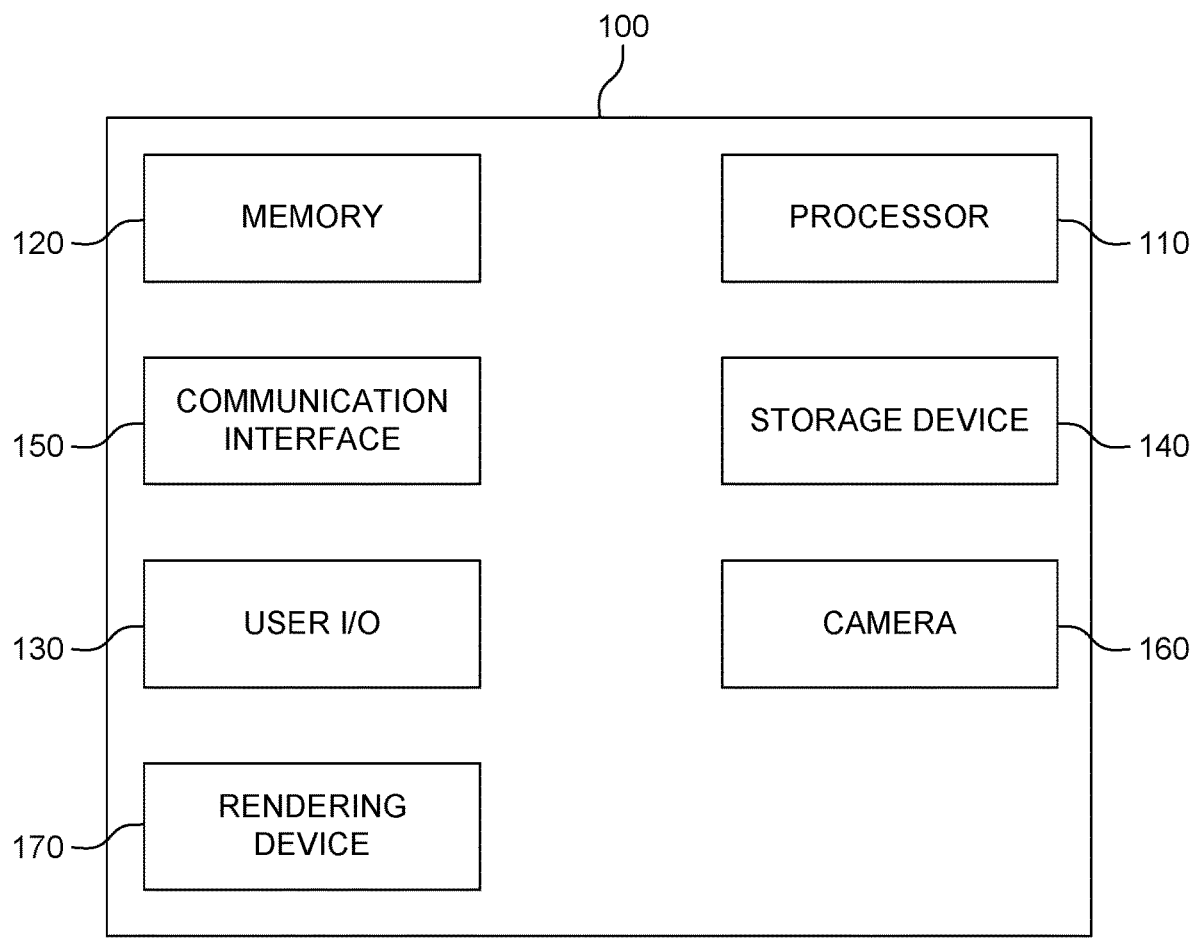
FIG. 1 illustrates an exemplary system for rendering a 3D scene of a video according to an embodiment of the disclosure.

FIG. 1 illustrates an exemplary apparatus for rendering a 3D scene of a video according to an embodiment of the disclosure. FIG. 1 illustrates a block diagram of an exemplary system 100 in which various aspects of the exemplary embodiments may be implemented. The system 100 may be embedded as a device including the various components described below and is configured to perform corresponding processes. Examples, of such devices, include, but are not limited to, mobile devices, smartphones, tablet computers, augmented reality glasses for display and embedded cameras for video capture. The system 100 may be communicatively coupled to other similar systems, and to a display via a communication channel.

Various embodiments of the system 100 include at least one processor 110 configured to execute instructions loaded therein for implementing the various processes as discussed below. The processor 110 may include embedded memory, input output interface, and various other circuitries as known in the art. The system 100 may also include at least one memory 120 (e.g., a volatile memory device, a non-volatile memory device). The system 100 may additionally include a storage device 140, which may include non-volatile memory, including, but not limited to, EEPROM, ROM, PROM, RAM, DRAM, SRAM, flash, magnetic disk drive, and/or optical disk drive. The storage device 140 may comprise an internal storage device, an attached storage device, and/or a network accessible storage device, as non-limiting examples.

Program code to be loaded onto one or more processors 110 to perform the various processes described hereinbelow may be stored in the storage device 140 and subsequently loaded onto the memory 120 for execution by the processors 110. In accordance with the exemplary embodiments, one or more of the processor(s) 110, the memory 120 and the storage device 140, may store one or more of the various item during the performance of the processes discussed herein below, including, but not limited to ambient images, captured input images, texture map, texture-free map, cast shadows map, 3D scene geometry, viewpoint's 3D pose, lighting parameters, variables, operations, and operational logic.

The system 100 may also include a communication interface 150, that enables communication with other devices via a communication channel. The communication interface 150 may include, but is not limited to, a transceiver configured to transmit and receive data from the communication channel. The communication interface 150 may include, but is not limited to, a modem or network card and the communication channel 150 may be implemented within a wired and/or wireless medium. The various components of the system 150 may be connected or communicatively coupled together (not shown) using various suitable connections, including but not limited to, internal buses, wires, and printed circuit boards.

The system 100 also includes video capturing means 160, such as a camera, coupled to the processor for capturing video images.

The system 100 also includes video rendering means 170, such as a projector, or a screen, coupled to the processor for rendering the 3D scene.

The exemplary embodiments may be carried out by computer software implemented by the processor 110, or by hardware, or by a combination of hardware and software. As a non-limiting example, the exemplary embodiments may be implemented by one or more integrated circuits. The memory 120 may be of any type appropriate to the technical environment and may be implemented using any appropriate data storage technology, such as optical memory devices, magnetic memory devices, semiconductor-based memory devices, fixed memory, and removable memory, as non-limiting examples. The processor 110 may be of any type appropriate to the technical environment, and may encompass one or more microprocessors, general purpose computers, special purpose computers, and processors based on a multi-core architecture, as non-limiting examples.

The implementations described herein may be implemented in, for example, a method or a process, an apparatus, a software program, data stream, or a signal. Even if only discussed in the context of a single form of implementation (for example, discussed only as a method) the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), tablets, Head-Mounted devices, and other devices that facilitate virtual reality applications.

The disclosure is applicable to Augmented Reality (AR) applications where virtual objects are inserted in (composited with) a live-video feed of a real environment, using see-through devices, such as, for example, mobile phones, tablets, AR glasses for display and embedded cameras for video capture.

The goal is that a viewer watching such mixed video feed cannot distinguish between real and virtual objects. Such applications require the integration of 3D virtual objects into a 2D video image with consistent rendering of light interactions in real time. The virtual object insertion in the real-world video should be the most realistic possible considering several technical aspects: position of the virtual object, orientation of the virtual object (dynamic accuracy, as if the object was hooked/anchored in the real 3D space when the user moves the camera), lighting conditions (reflection/refraction of different light sources depending on the virtual material properties of the virtual object).

Interactions with both real and virtual worlds mixed together (composited) to render a mixed plausible video feed (mixed reality with synthetic 3D objects inserted in a 2D live-video feed, frame by frame in real-time condition) are also very important. Such interactions may include, for example, light interactions (global illumination, with real and virtual lights), and physic interactions (interaction between objects, both real and virtual), as non-limiting examples.

The speed of the requested computer processing is also really important. The latency between acquisition of the real-world scene by the video camera for a single frame and the display of the corresponding "augmented" frame (with 3D objects) on the display device should be close to 0 ms, so that the viewer (which is also the person using the camera) lives an immersive experience.

Figure 2A:
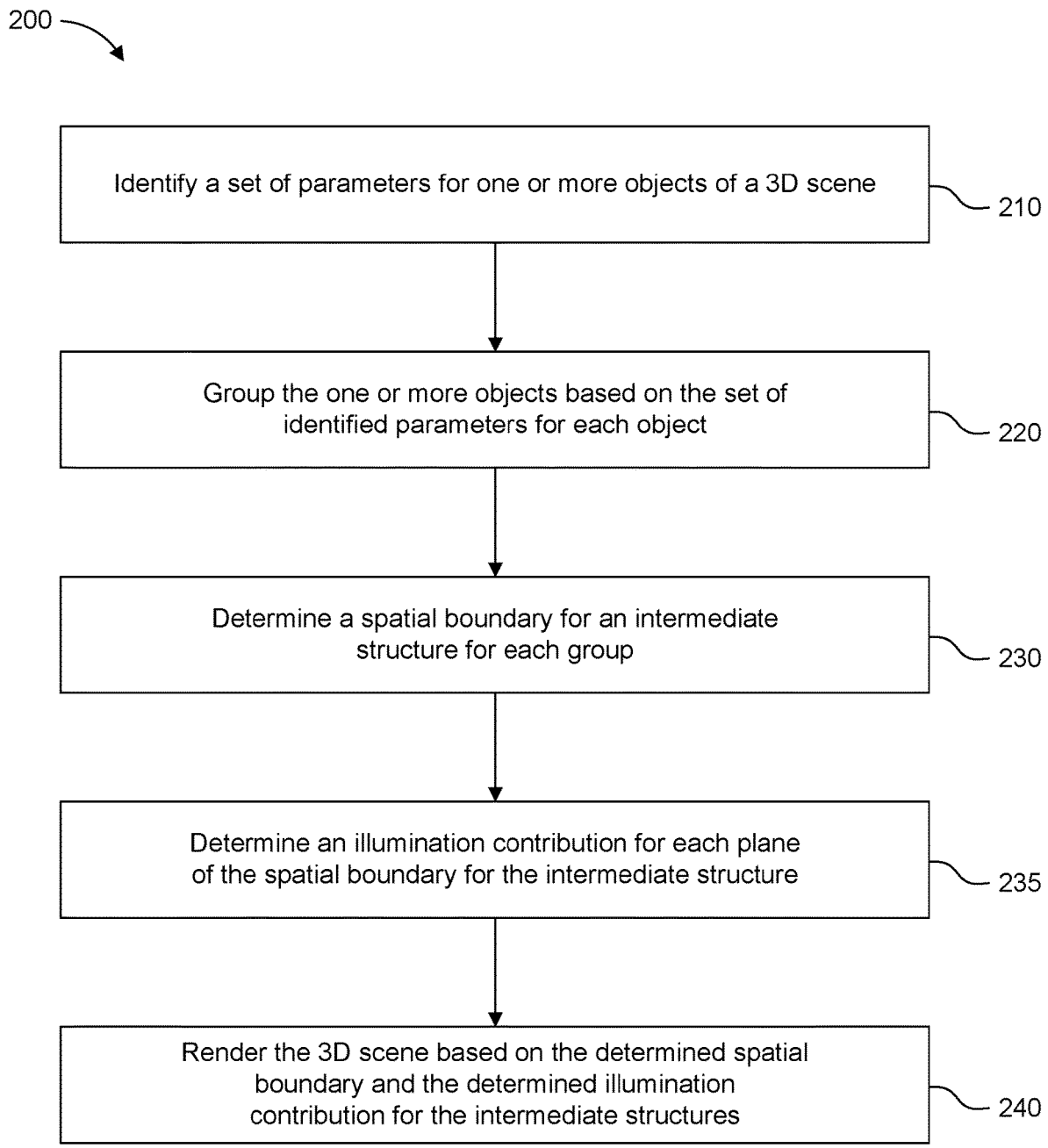
FIG. 2A is a flowchart of a particular embodiment of a proposed method for rendering of a virtual object of an AR (augmented reality) or MR (mixed reality) application in a real-world 3D environment.

FIG. 2A is a flowchart of a particular embodiment of a proposed method for placement of a virtual object of an AR (augmented reality) or MR (mixed reality) application in a real-world 3D environment. In this particular embodiment, the method includes five consecutive steps 210 to 240.

In an exemplary implementation, described below, the method is carried out by a rendering device 170 (e.g., smartphone, a tablet, or a head-mounted display). In an alternative exemplary implementation, the method is carried out by a processor 110 external to the rendering device 170.

In the latter case, the results from the processor 110 are provided to the rendering device 170.

Figure 3:
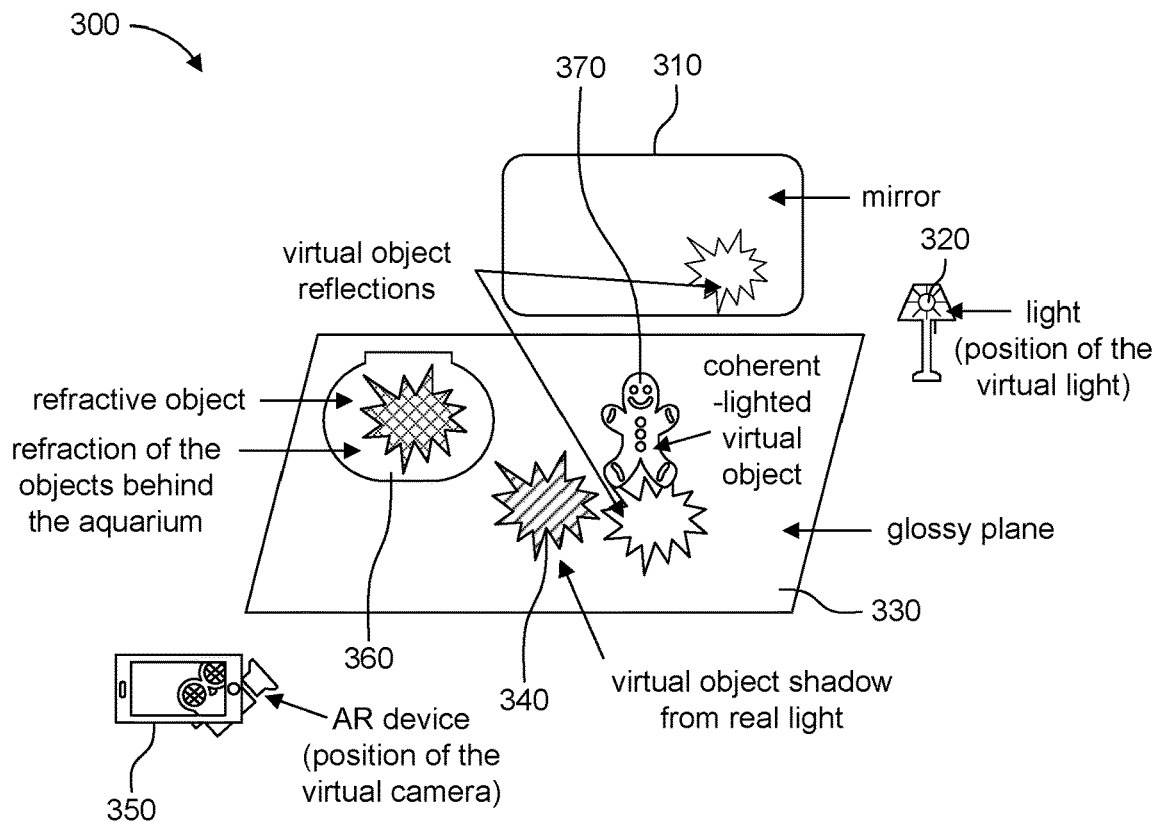
FIG. 3 is an illustration showing a position of a virtual camera as well as a position of a real camera that captures the typical AR scene.

An illustration of a typical AR scene which is shown in FIG. 3. The scene shown in FIG. 3 is composed of tangible objects including real objects and virtual objects. Some exemplary tangible objects that are real objects include a reflective planar object (mirror) 310, a glossy planar object (floor plane) 330, a refractive object (fishbowl) 360, a point light 320. An exemplary tangible object that is a virtual object includes a metallic virtual character 370.

Additional virtual objects (not shown) may be added to the scene to add realism and to support rendering. Examples of such virtual objects may include an invisible virtual mirror (a proxy of the real mirror object having the same size and position), an invisible virtual light (a proxy of the real light), and an invisible glossy plane (a proxy of the real glossy plane having the same size and position).

The following sub-sections describe a particular embodiment of the proposed method of FIG. 2A for placement of a virtual object of an AR (augmented reality) or MR (mixed reality) application in a real-world 3D environment. The particular embodiment provides high-quality rendering for each object of the AR scene displaying a variety of rendering aspects.

In step 210, a set of parameters for one or more objects of a 3D scene are identified. This step is required for non-light and non-camera objects in the scene and is based on a prior knowledge of the AR scene. Each of the objects in the scene are identified as either real objects or virtual objects in the context of AR, based on a set of parameters.

The set of parameters may include, for example, object planarity—whether the object is planar or non-planar, object refractivity—an integer value may be used (0 for a non-refractive object, or 1 for a refractive object), and an object weight value which relates to the object's importance to the 3D scene. An integer value from 0 to N may be used for the object weight value. The higher the object weight value, the better will be the rendering of the object.

The object weight value corresponds to the number of intermediate (middle-field) structures to be used for such object. For example, an object weight of 0 may indicate that this object shares its middle-field structure with other objects. The object importance weight may be determined based on the following criteria: the AR device 350 position and orientation, as well as its distance to the object and the surroundings of the object.

In most of the cases, the object importance weight is equal to 1. However, other weight values can be set depending on the object importance on the scene rendering and the influence of its surrounding objects to optimize the trade-off between rendering quality and performance (e.g., memory cost, frame rate).

Referring to FIG. 3, the set of parameters of the 3D scene objects are as follows:
Planar objects with a refractivity of 0 and with an importance weight of 1: mirror 310 and floor plane 330;
Non-planar objects with a refractivity of 1 and with an importance weight of 1: fishbowl 360;
Non-planar objects with a refractivity of 0 and with an importance weight of 2: metallic virtual character 370.
The step 220 groups together all the objects having an importance weight of 0.
Referring to FIG. 3, all the groups contain a single object with an importance weight that is non-zero.

For one particular embodiment, shown as step 230 in FIG. 2A, an area is determined for each non-light and each non-camera object of the 3D scene of said video. The area defines a shape for each of the non-light and non-camera objects in the 3D scene. One technique known as axis-aligned bounding box (AABB) may be used to define this area. AABB is advantageous as it only requires comparisons of coordinates, it allows the quick exclusion of coordinates that are far apart.

The AABB for a given point set (S) is typically its minimum area subject to the constraint that the edges of the box are parallel to the coordinate (Cartesian) axes. It is the Cartesian product of N intervals each of which is defined by the minimal and maximal of the corresponding coordinate for the points in S.

At step 230, a spatial boundary of an intermediate structure for the one or more objects in the scene is determined.

An exemplary mathematical definition for a middle field image is:

For a group of geometries $\Sigma_{i=0}^{n} Gi(x, y, z)$, where Gi indicates a geometry with associated positions x, y, z in Cartesian coordinates can be represented by a set of middle field images $\Sigma_{i=0}^{N} Mi(\theta, \psi, P)$, where $\theta$ and $\psi$ represent the rotation of the image, and P is the position of the image. n should be much smaller than N to make the representation efficient.

The spatial boundary of the intermediate structure (middle field structure) is based on the object type (e.g., light, camera, other object) and on the grouping based on the object importance weight parameter discussed above with respect to steps 210 and 220.

For the light objects, the spatial boundaries of the middle-field (intermediate) structure attached to a light is a plane or set of planes.

For the camera objects, the spatial boundaries of the middle-field (intermediate) structure attached to a camera is a plane.

For the non-light and non-camera objects:
  for planar objects—the spatial boundaries of the middle-field (intermediate) structure attached to a planar object is limited to a single plane corresponding to the object plane.
  for non-planar objects—the spatial boundaries of the middle-field (intermediate) structure(s) attached to a non-planar object are a set of orthogonal planes. Without partition, there are 6 orthogonal planes.

Figure 4:
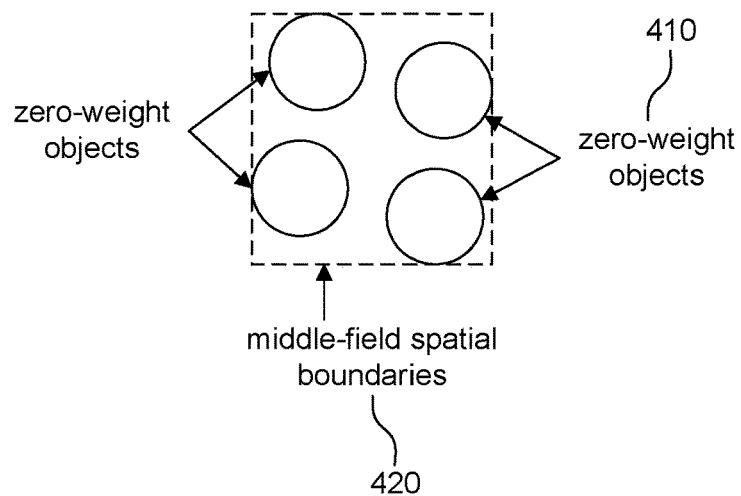
FIG. 4 is an illustration of a related shared group of objects having an object importance weight of 0.

As illustrated in FIG. 4, for a related shared group of objects 410 having an object importance weight of 0, the 6 planes correspond to the bounding box (determined area) 420.

Figure 5:
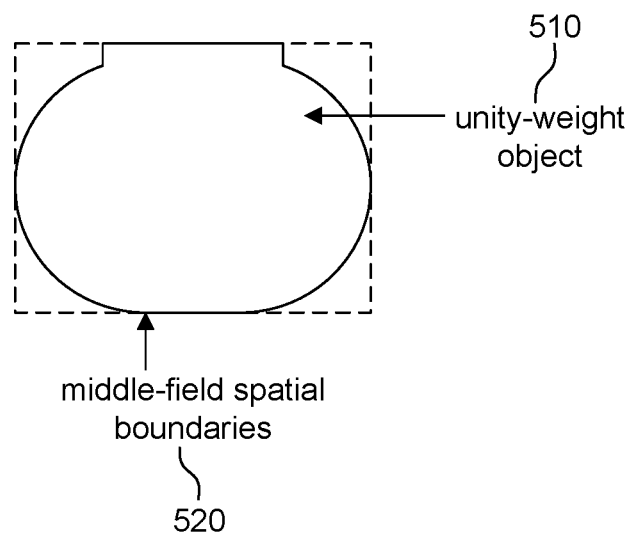
FIG. 5 is an illustration of an object having an object importance weight of 1.

As illustrated in FIG. 5, for an object 510 having an object importance weight of 1, the 6 planes correspond to the bounding box (determined area) 520.

Figure 6:
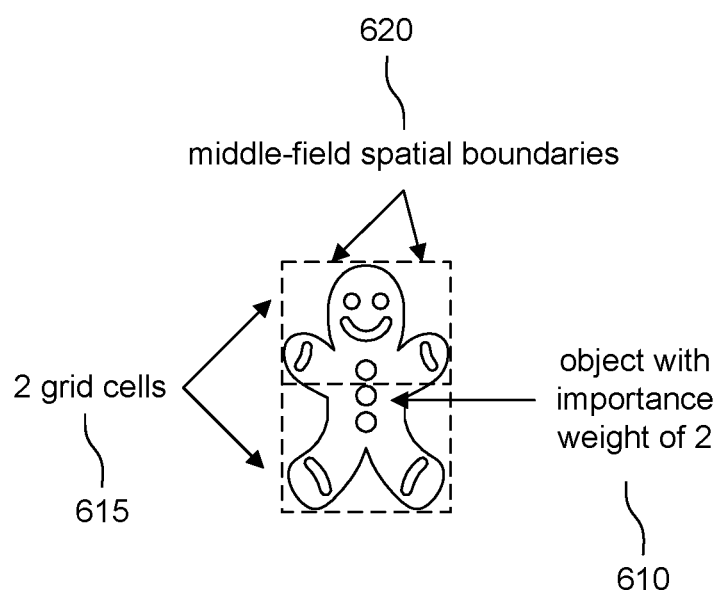
FIG. 6 is an illustration of an object having an object importance weight of 2.

As illustrated in FIG. 6, when an object 610 has an object importance weight of 2, the object is partitioned into a uniform equally spaced grid of cells 615. The number of grid cells (N) is equal to the importance weight value. In the example shown in FIG. 6, the object importance weight is 2, so the grid has two uniform equally spaced cells 615. There is one middle-field (intermediate) structure 620 per grid cell 615.

In one exemplary embodiment, shown as step 235 in FIG. 2A, after the spatial boundary of an intermediate structure for each of the objects in the scene is determined a set of images may be generated using virtual cameras to activate the middle field structure, for example, attached to a light. In this step, an illumination contribution for each plane of the spatial boundary for the intermediate structures is determined. This step is advantageous for light that cast shadows in the scene.

Figure 7:
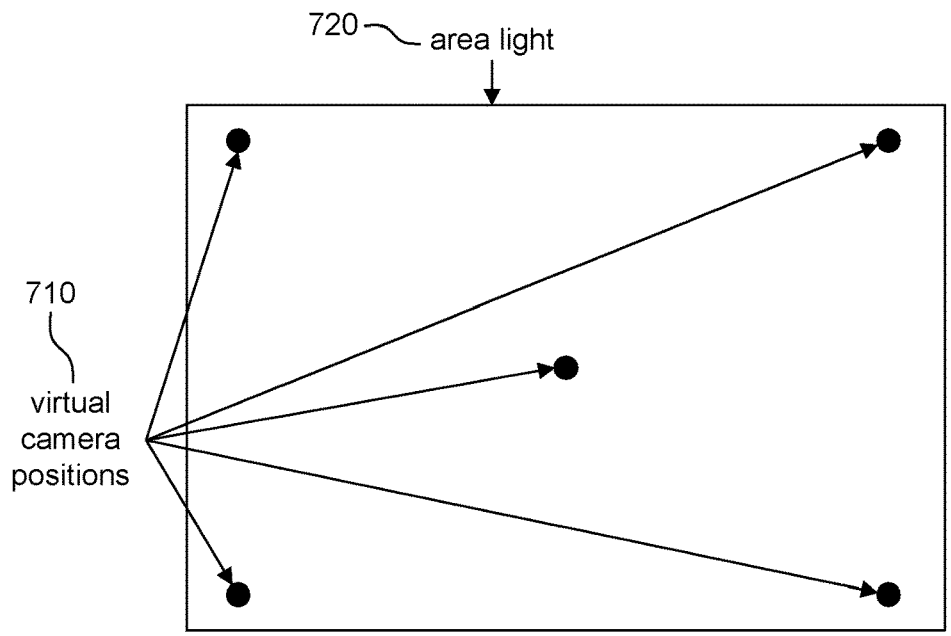
FIG. 7 is an illustration of virtual cameras positioned over the surface of an area light to support soft shadowing of objects in the 3D scene of the video.

For a middle-field structure attached to a light, a virtual camera 710 is placed at the light position. Additional virtual cameras can be placed on the same plane of middle-field structure 720 to support soft shadowing as illustrated in FIG. 7. The number of generated images per virtual camera 710 depends on the light type and more precisely on the angular aperture of the light. Typically, an angular aperture of less than 160 degrees can be managed by using a single image.

For example, the following number of images are generated per virtual camera:
- 1 image may be generated for a spotlight to cover a spot aperture;
- 4 images may be generated for an area light to cover a hemisphere;
- 6 images may be generated for a point light to cover the whole space.

For each generated image, the virtual camera frustrum is set to cover the wanted part of the space.

For a light object, the content of each pixel of the generated images is a single float value corresponding to depth information for visibility. For example, the depth information may correspond to the distance between the positions of the light and the intersected object along the direction corresponding to that pixel.

Figure 8:
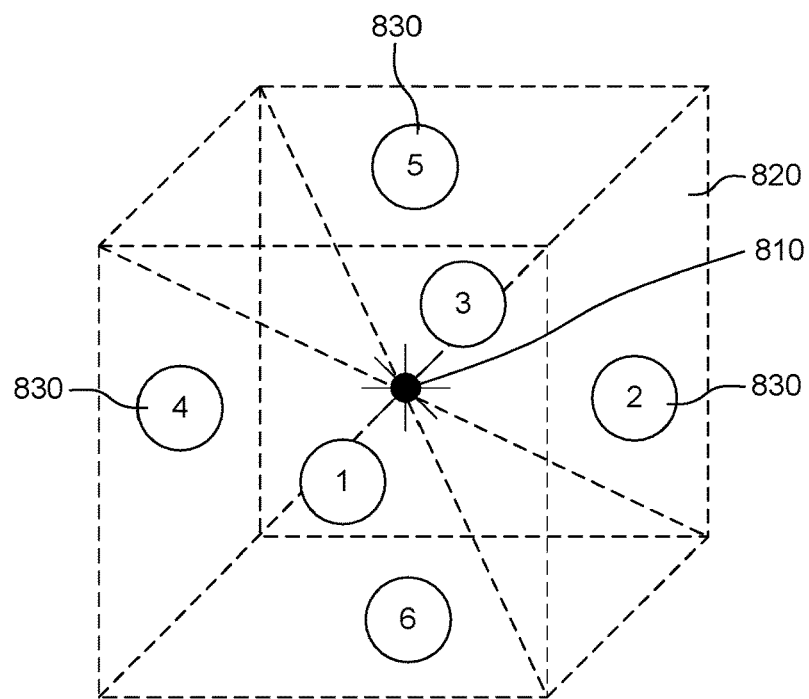
FIG. 8 is an illustration of the visibility determination for the middle-field structure of the light of FIG. 3.

The visibility determination of the middle-field structure of the light 320 of FIG. 3 is illustrated in FIG. 8. As the light 810 is a point light, the whole space may be covered by the middle-field structure. Therefore, 6 images 830 composing a cube mapping 820 are generated.

Referring to FIG. 2A, at step 240, the 3-D scene is rendered based on the determined spatial boundary of an intermediate (middle-field) structure for each of the one or more objects in the scene. The rendering of the 3D scene is performed by a camera using ray tracing. The middle-field structures are used as acceleration structures instead of traditional spatial partitioning acceleration structures (e.g. Bounding Volume Hierarchy (BVH)). In the exemplary embodiment, the raytraced geometries are equivalent to raytracing their corresponding middle field image ray type. Available ray types commonly used for raytracing are:
- Camera rays: the initial rays that come out of the camera.
- Secondary rays (next rays) generated when interacting with materials (e.g., reflection, refraction).
- Shadow rays: special rays used to detect occlusion between light sources and geometry.

An exemplary mathematical definition for a ray group is:

$$\Sigma_i^n Ri(\theta,\psi,W) P_i$$

where for a ray (Ri) in the group, P is the origin or destination of the rays in the group, the number of rays corresponds to the number of images which represent the intersected geometry group. $\theta$, $\psi$ are the rotation of a ray, and W is the approximation of the lobe size representing the divergence of the rays in the group.

The larger the lobe (W), the more blurred/anti-aliased the ray group if the ray is a camera ray. The larger the lobe (W), the rougher the ray group if the ray is a secondary ray (reflection/refraction) and the softer the ray group if the ray is a shadow ray. The minimum lobe size equates to 0 divergence. For such an instance, then one ray is enough to sample the domain (camera ray, reflection ray, refraction ray, shadow ray), thus n=1 for middle-field images.

For camera primary rays, the rendering of the camera primary rays is done by activating the middle-field structure attached to the camera. The generated image corresponds to the rasterized image of the scene viewed by the camera. The content of each image pixel is a vector of 3 float components storing the color information (e.g., red, green and blue color values) of the closest hit object.

For secondary rays, the rendering is performed for each visible object from the current camera. One exemplary embodiment for determining this visibility, is to check if the object bounding box intersects the camera frustrum (i.e., using for example, a viewing frustrum culling technique). Initially, the middle-field structure(s) attached to the object is/are activated. Then the color information is retrieved by an adequate look-up of the generated images.

Figure 9:
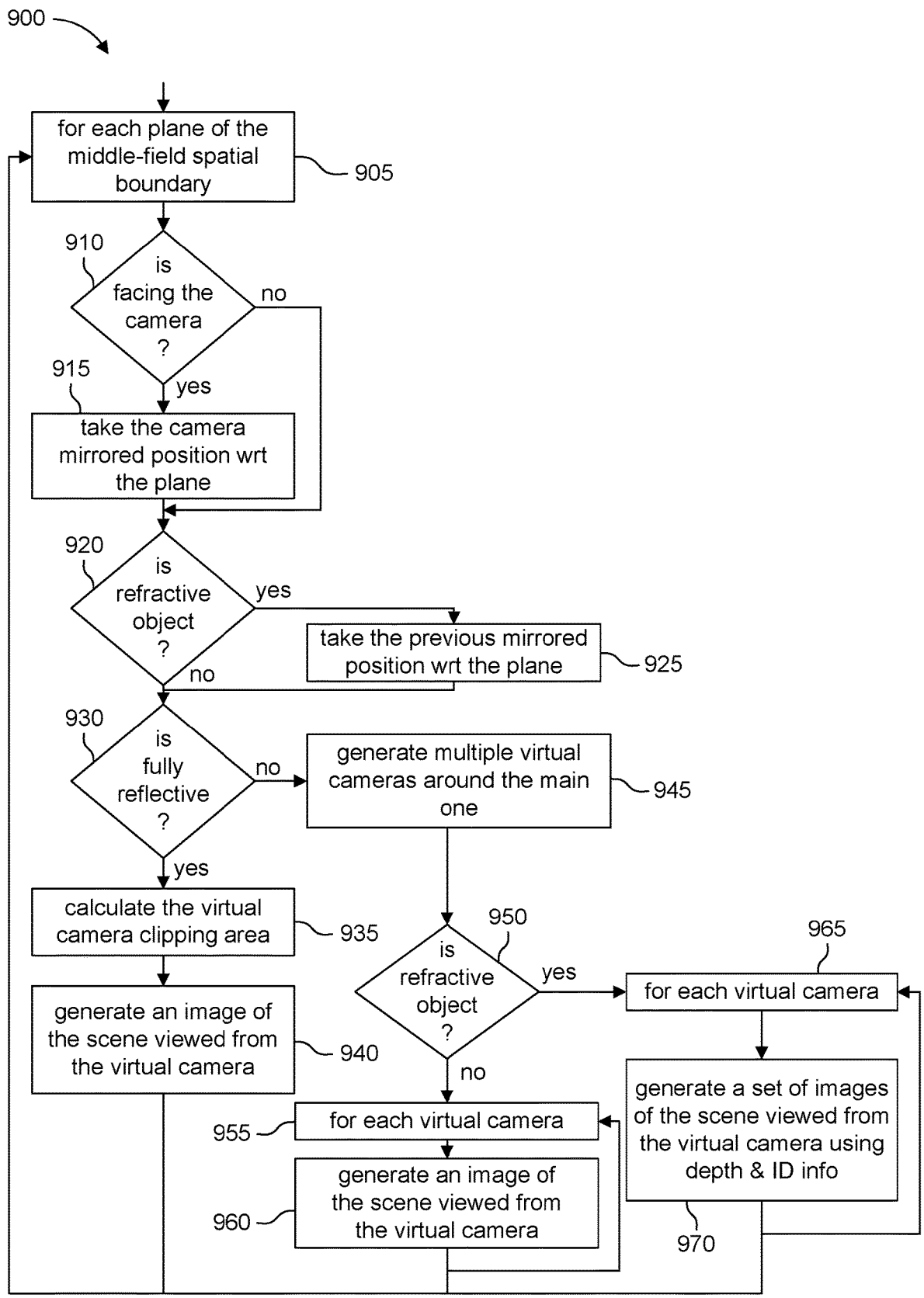
FIG. 9 is a flowchart of the color information determination for the middle-field structure(s) for a current object.

The activation of the middle-field structure(s) for the current object is illustrated in the flowchart 900 shown in FIG. 9.

At steps 905 and 910, a check is made as to whether the camera is facing the middle-field structure plane. If no, proceed to step 920.

At step 915, if the camera is facing the middle-field structure plane, take the camera mirrored position with respect to the plane.

After step 915, if the object is refractive (step 920), take the camera mirrored position with respect to the plane (step 925) and proceed to step 930. If the object is not refractive (step 920) proceed to step 930.

At step 930, if the object is fully reflective, calculate the virtual camera clipping area (step 935). After step 935, generate an image of the scene viewed from the virtual camera (step 940).

At step 930, if the object is not fully reflective, generate multiple virtual cameras around the main camera (step 945). If the object is not refractive (step 950), for each virtual camera (step 955), generate an image of the scene viewed from the virtual camera (step 960).

At step 950, if the object is refractive, for each virtual camera (step 965), generate a set of images of the scene viewed from the virtual camera using depth and ID information (step 970).

Figure 10:
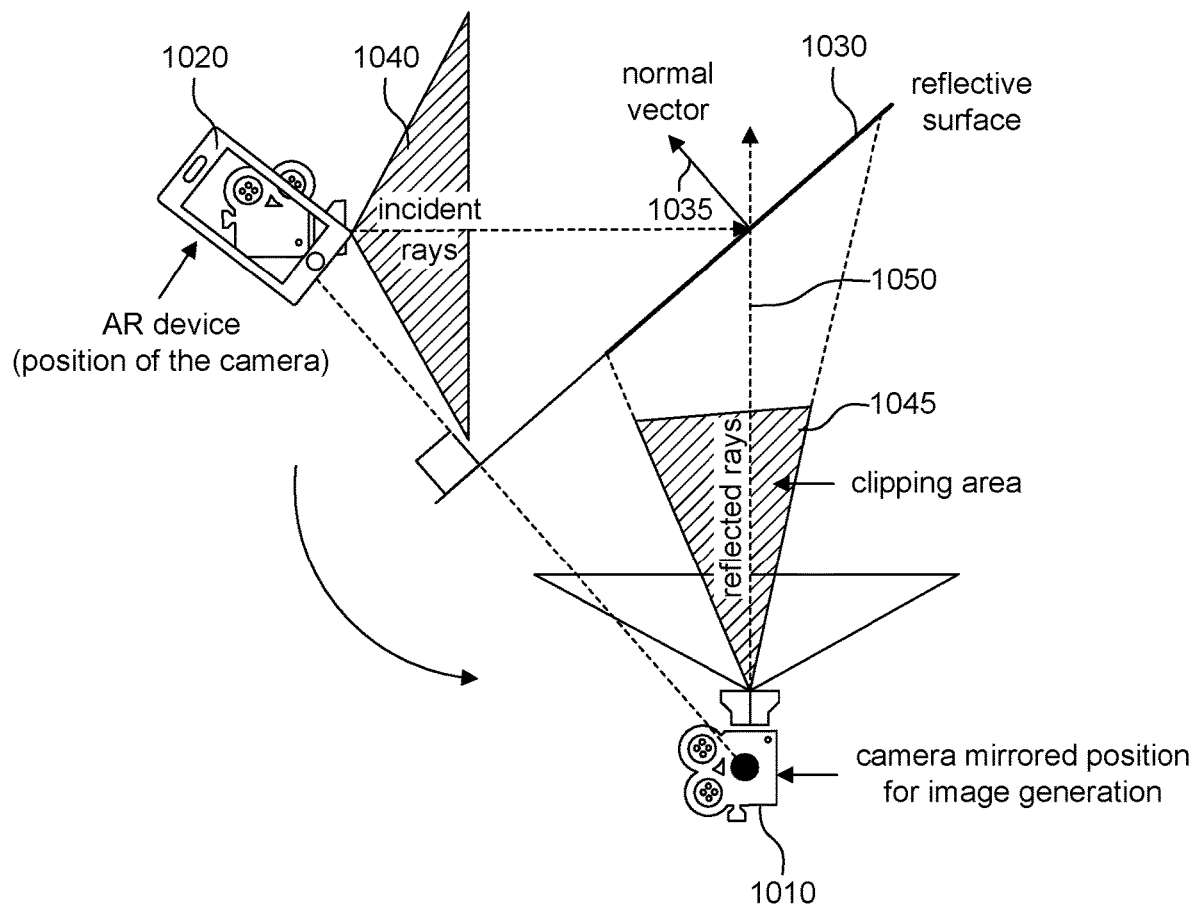
FIG. 10 is an illustration of the color information determination for the middle-field structure according to the exemplary flowchart of FIG. 9, for the real mirror plane shown in FIG. 3.
Figure 11:
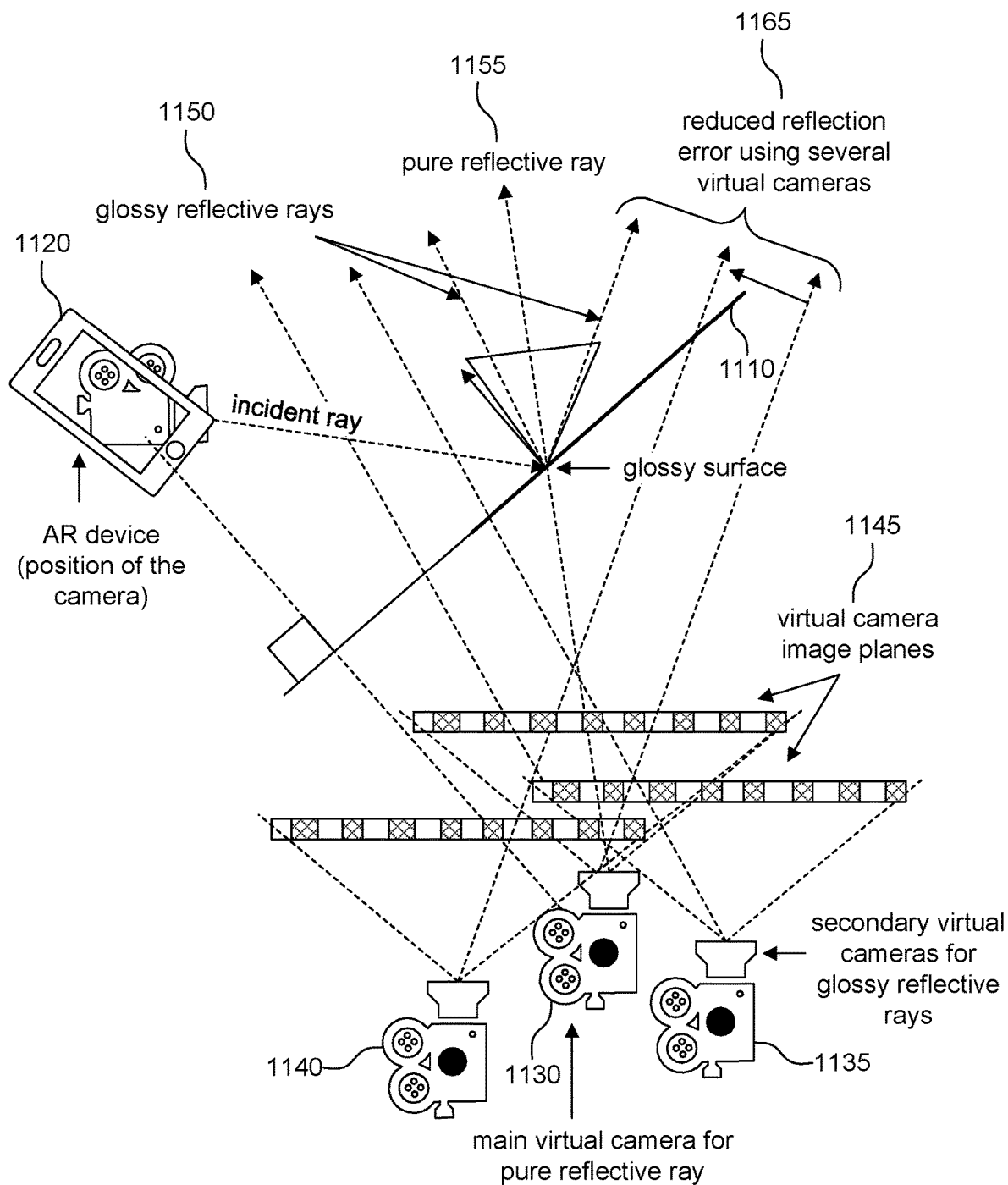
FIG. 11 is an illustration of the color information determination for the middle-field structure according to the exemplary flowchart of FIG. 9, for the real glossy plane shown in FIG. 3.
Figure 12:
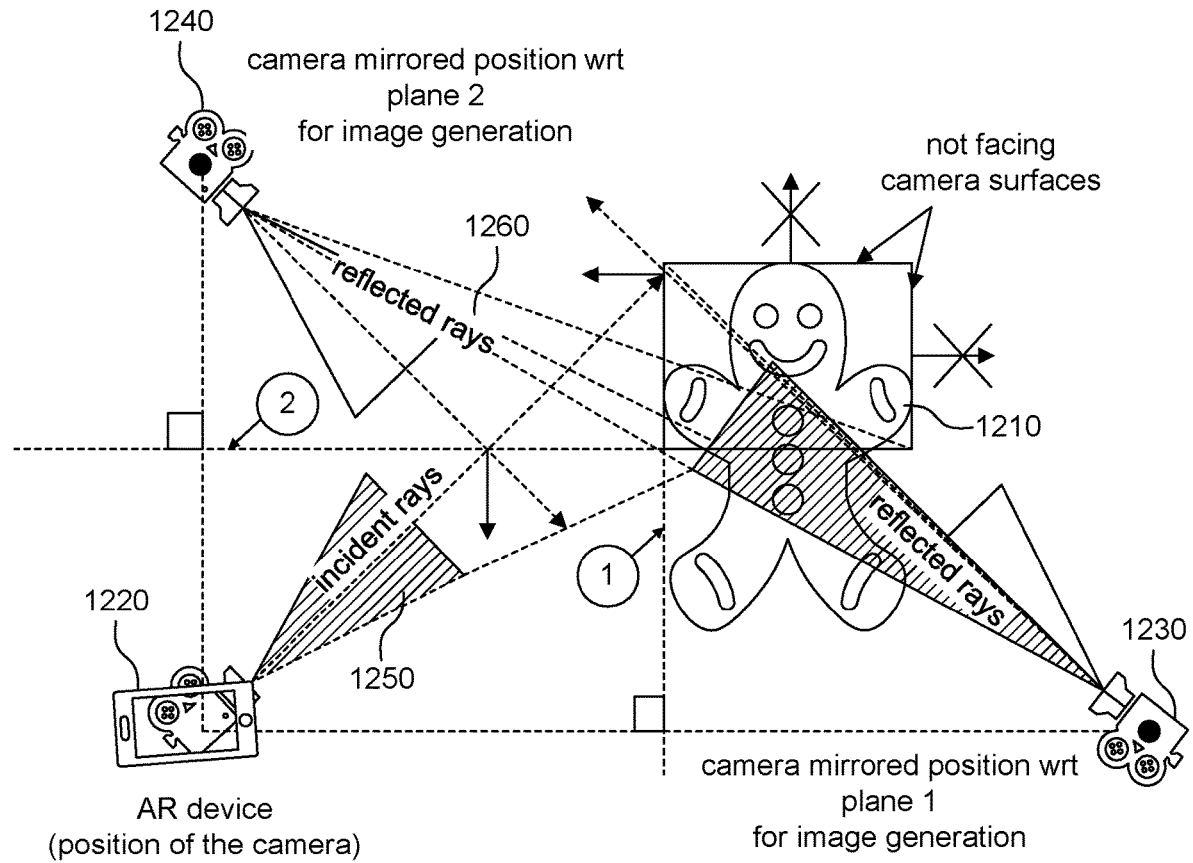
FIG. 12 is an illustration of the color information determination for the middle-field structure according to the exemplary flowchart of FIG. 9, for the virtual metallic character shown in FIG. 3.

Color information determination for the middle-field structure according to the exemplary flowchart of FIG. 9, for the mirror plane 310, the glossy plane 330, and the virtual metallic character 370 of FIG. 3, are shown in FIGS. 10, 11 and 12, respectively.

Referring to FIG. 10, the mirror plane 310 of FIG. 3 is shown as reflective surface 1030. The illustration shown in FIG. 10 follows steps 905, 910, 915, 920, 930, 935 and 940 shown in the flowchart depicted in FIG. 9. The forward direction of the camera 1020 and the normal vector of the mirror plane are used to determine if the plane is facing the camera (step 910). Thereafter, since object 310 has a reflective surface the clipping area for the imaging camera 1010 is calculated and then using reflected rays in the clipping area an image of the scene viewed from imaging camera 1010 is generated (step 940).

Referring to FIG. 11, the glossy plane 330 of FIG. 3 is shown as surface 1110. The illustration shown in FIG. 11 follows steps 905, 910, 915, 920, 930, 945, 950, 955 and 960 shown in the flowchart depicted in FIG. 9. The forward direction of the camera 1120 and the normal vector of the mirror plane are used to determine if the plane is facing the camera (step 910). As this is the case shown in FIG. 11, the main camera mirrored position is determined (step 915). Thereafter, since glossy surface 330 not fully reflective (step 930) multiple virtual cameras 1135, 1140 are generated around main virtual camera 1130 (step 945). Then, for each virtual camera 1130, 1135, 1140 (step 955), an image of the scene viewed from the virtual camera 1130, 1135, 1140 is generated (step 960).

Referring to FIG. 12, a grid cell of the virtual character 370 of FIG. 3 is shown as 1210. The illustration shown in FIG. 12 follows steps 905, 910, 920, 930, 935 and 940 shown in the flowchart depicted in FIG. 9. The forward direction of the camera 1220 and the normal vector of each middle-field plane are used to determine if the plane is facing the camera (step 910). This is the case for the planes 1 and 2. Therefore, the main camera mirrored positions are determined for planes 1 and 2 (step 915). Thereafter, by assuming that the virtual metallic character 370 fully reflective (step 930), the virtual camera clipping area is calculated from the incident camera frustrum and the size of the corresponding spatial boundary plane (step 935). Then, for each virtual camera 1230, 1240, an image is generated (step 940). The content of each image pixel is vector of three float components storing the color information (e.g., red, green, blue color values) of the closest hit object.

Figure 13:
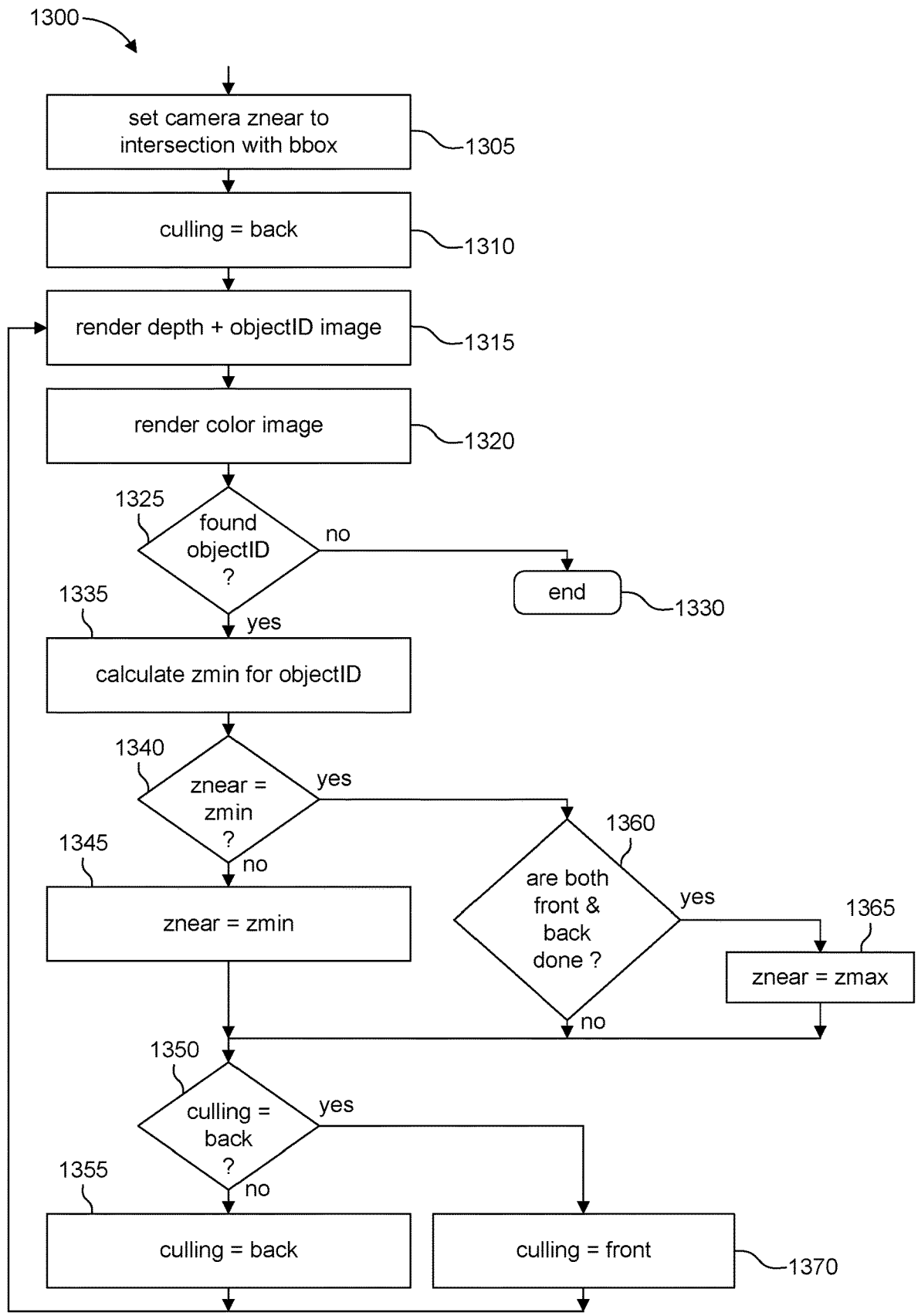
FIG. 13 is a flowchart for the generation of images using one virtual camera for a refractive object.

The generation of images for one virtual camera for a refractive object (step 970 of FIG. 9) is illustrated in the flowchart 1300 shown in FIG. 13.

At steps 1305 and 1310, the camera is set znear the intersection of the bounding box for the object and culling=back is performed.

At step 1315, the depth of the object is rendered and the object ID is imaged.

After step 1315, a color object is rendered (step 1320), if an object ID is found (step 1325), proceed to step 1335. If the object ID is not found (step 1325) proceed to step 1330 (end).

At step 1335, for object ID calculate the zmin. After step 1335, if znear≠zmin (step 1345) and set znear=zmin.

After step 1335, if zmin=znear, proceed to step 1360. At step 1360, if object culling for front and back surfaces is performed proceed to step 1365 and set zmax=zmin and proceed to step 1350. At step 1360, if object culling for front and back surfaces is not performed proceed to step 1350.

At step 1350, if the culling=back is no set culling=back (step 1355). At step 1350, if the culling=back is yes, set culling=front (step 1370). After steps 1370 and 1355 proceed to step 1315 the object is imaged based on the object depth and the object ID.

Figure 14:
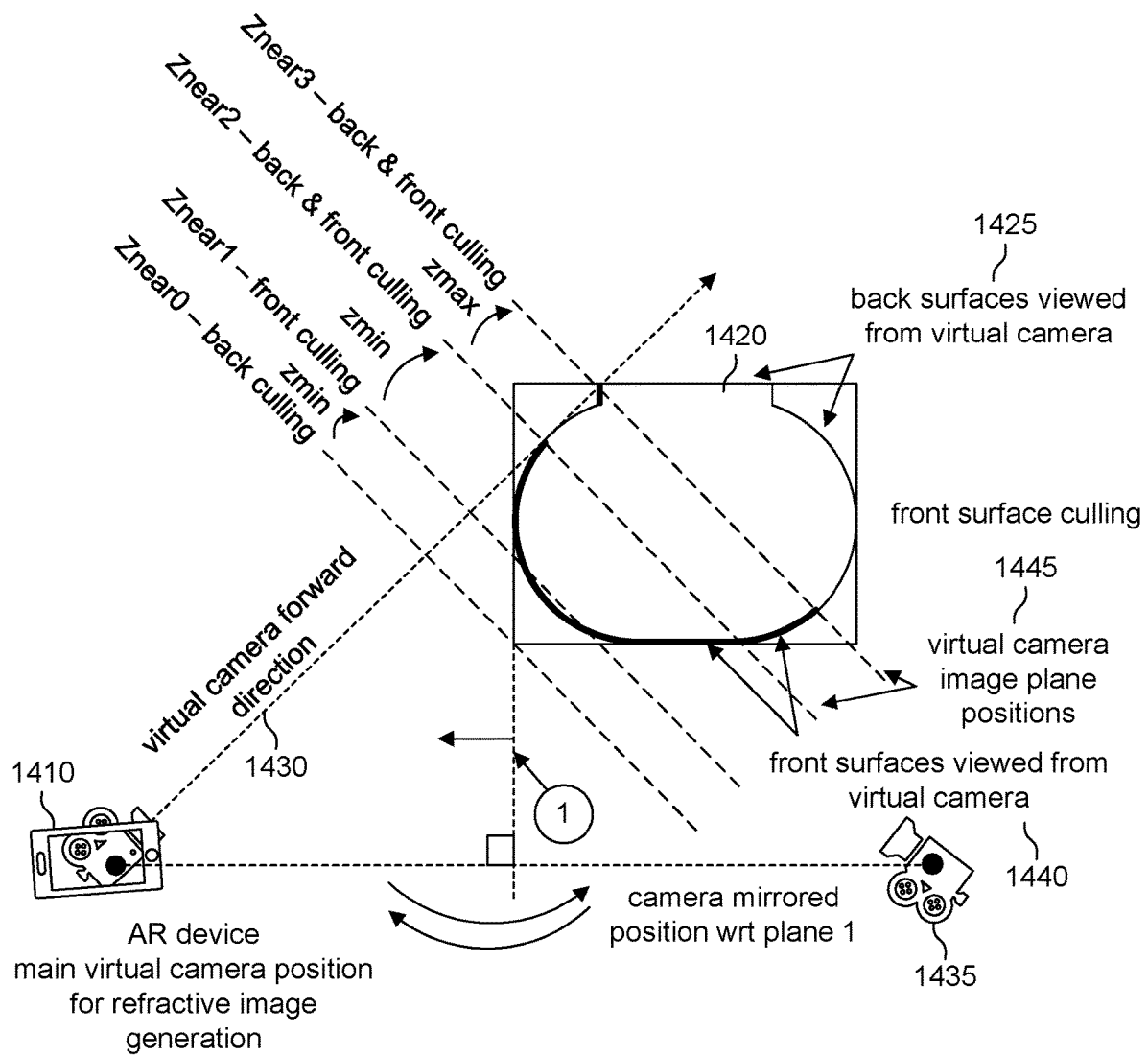
FIG. 14 is an illustration of the color information determination for the middle-field structure according to the exemplary flowchart of FIG. 13, for the fishbowl shown in FIG. 3.

Activation of the middle-field structure according to the exemplary flowchart of FIG. 13, for the fishbowl 360 of FIG. 3, is shown in FIG. 14.

Referring to FIG. 14, the fishbowl 310 of FIG. 3 is shown as object 1420. The position of camera 1410 is used to determine the camera mirrored position for imaging camera 1435. As the fishbowl is a refractive object, the camera 1435 is again mirrored (step 925 of FIG. 9) so as to use camera 1410 for generating the images. Thereafter, since object 310 has a refractive surface, front and back culling is performed using virtual camera viewing and plane positions 1440, 1445, 1425. Thereafter, the refractive object is generated using depth and ID information.

The generated images correspond to the rasterized images of the scene viewed by virtual cameras. The content of each image pixel is a vector of 3 float components storing the color information (e.g., red, green and blue color values) of the closest hit object. The number of generated images for each middle-field structure depends on:
  the object material type:
    a single generated image per plane for fully reflective material (FIGS. 10 and 12),
    a few images per plane for glossy (FIG. 11) or refractive material (FIG. 14).
The frustrum of the virtual camera is set to support most of the outgoing ray directions and hence depends on the object material glossiness or index of refraction. A typical angular aperture of around 120° covers most of the cases.

The virtual camera frustrum is optimized for a fully reflective object as the clipping planes can be calculated from the incident frustrum and the size of the corresponding spatial boundary plane (FIGS. 10 and 12). For glossy and/or refractive objects, several virtual cameras may be placed around the main one, for each boundary plane to reduce the error of the outgoing rays (FIG. 11). Typically, two or three additional virtual cameras are enough to reduce significantly the error. For refractive objects, additional images may be generated that contain the depth and object unique identifier information. As described in the flow chart of FIG. 13, these images are required to find the positions of the object medium interfaces from where the color images are generated.

Once all the middle field structures are determined, the color information for each incident ray is obtained. For a non-refractive object, the color information is obtained according to the flowchart 1500, of FIG. 15.

At steps 1505 and 1510, for each incident ray a hit point on the middle-field boundaries is calculated.

At step 1515, the position for the main virtual camera is determined.

After step 1515, the hit point is projected in the main virtual camera screen space (step 1520) and color information is read (step 1525).

At step 1530, if the object is fully reflective, set the final color as the read color information (step 1535).

At step 1530, if the object is not fully reflective, for each generated ray inside the reflected lobe (step 1540) determine one or more virtual cameras to minimize ray error (step 1545).

After step 1545, the hit point is projected in the selected virtual camera screen space (step 1550) and color information is read (step 1555). After step 1555, set the final color by blending all the color contributions (step 1560).

Figure 15:
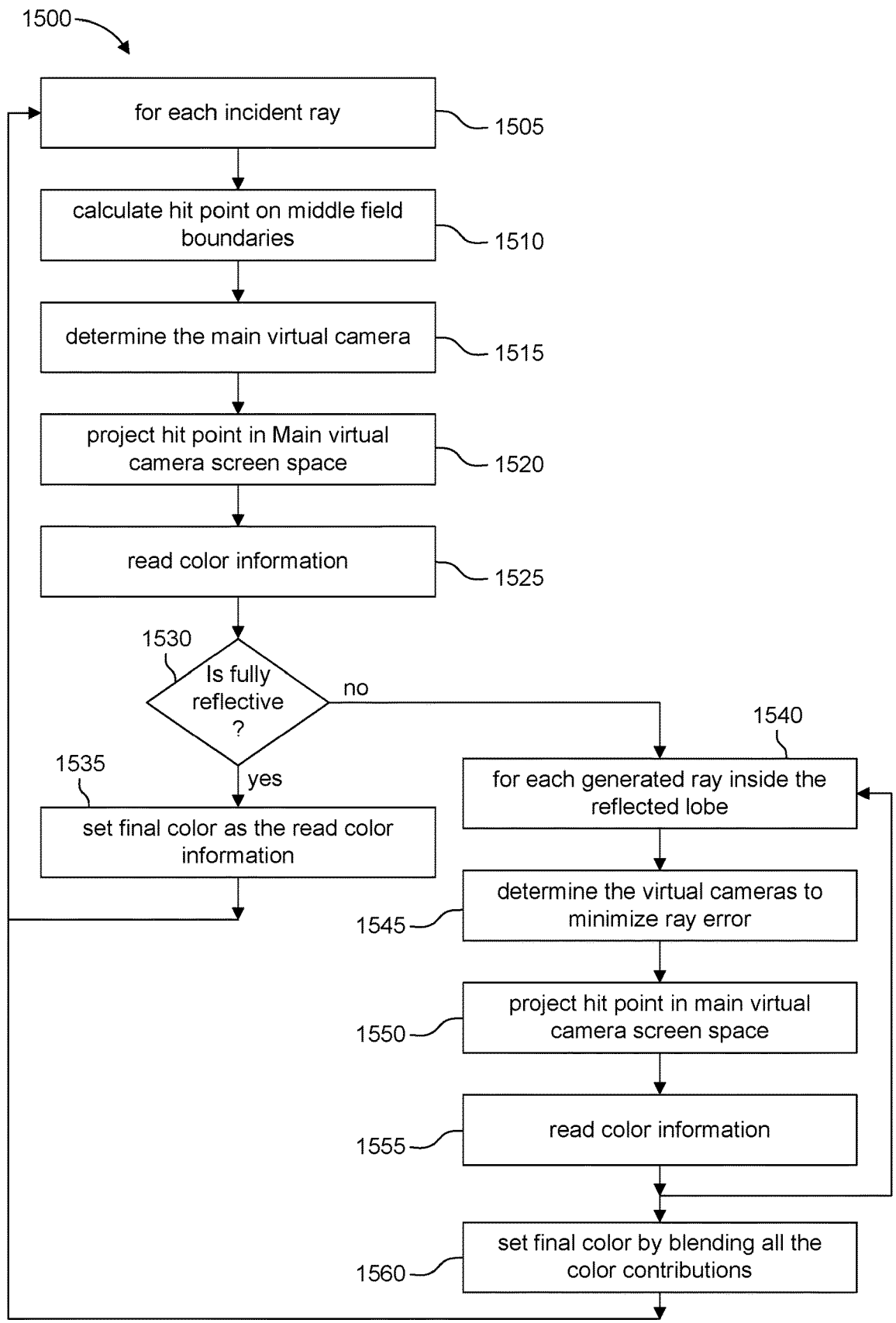
FIG. 15 is a flowchart for obtaining color information for a non-refractive object.
Figure 16:
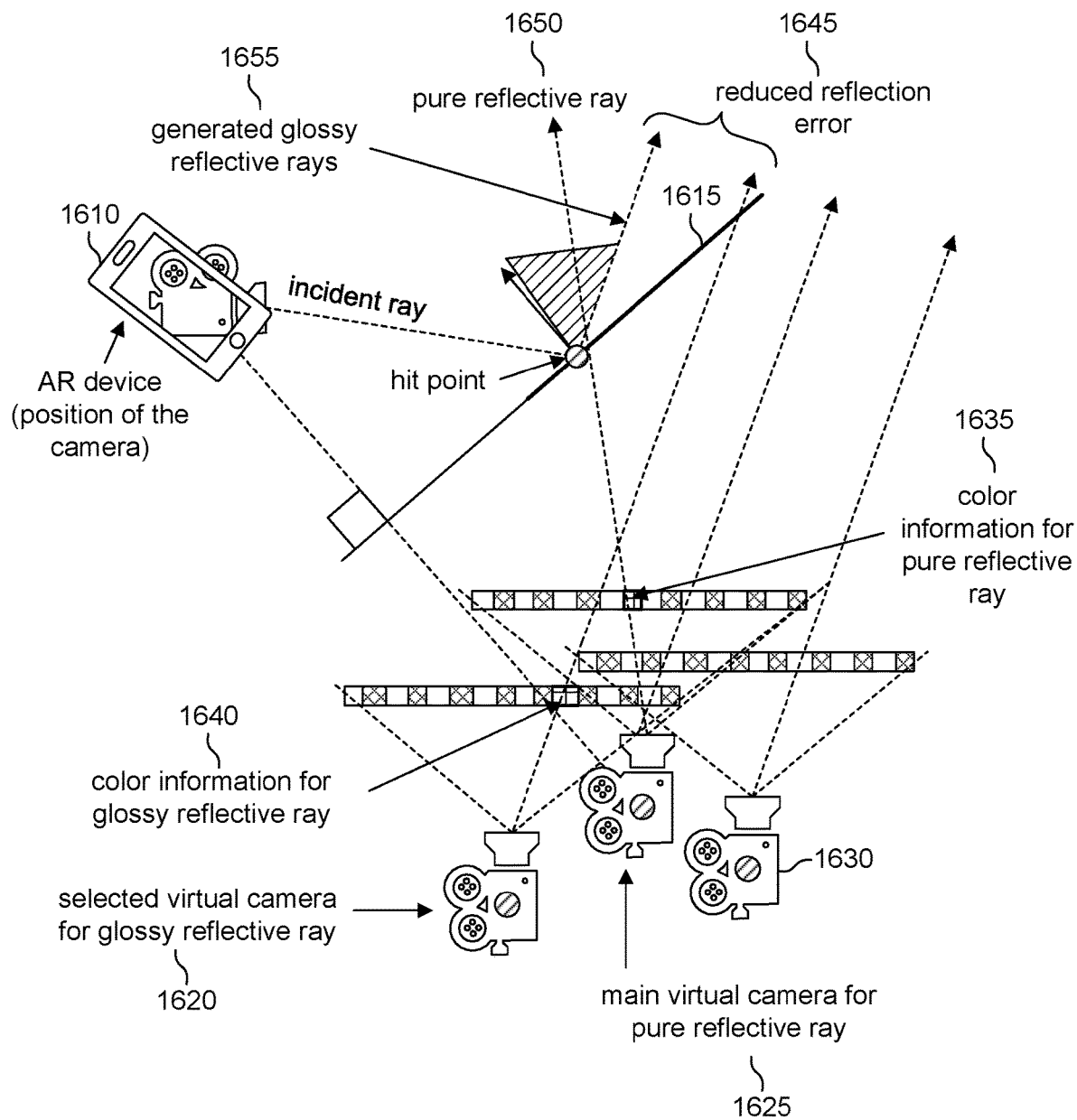
FIG. 16 is an illustration for obtaining color information for a non-refractive object according to the flowchart of FIG. 15, for the glossy plane shown in FIG. 3.

An illustration of the flowchart of FIG. 15, for a glossy surface is shown in FIG. 16. Incident rays from camera 1610 are used to calculate the hit point 1615 (step 1510) and determining the position for main virtual camera 1625. Thereafter, color information 1635, 1640 is generated around main virtual camera 1625 (step 1525) and additional virtual cameras 1620, 1630.

Figure 17:
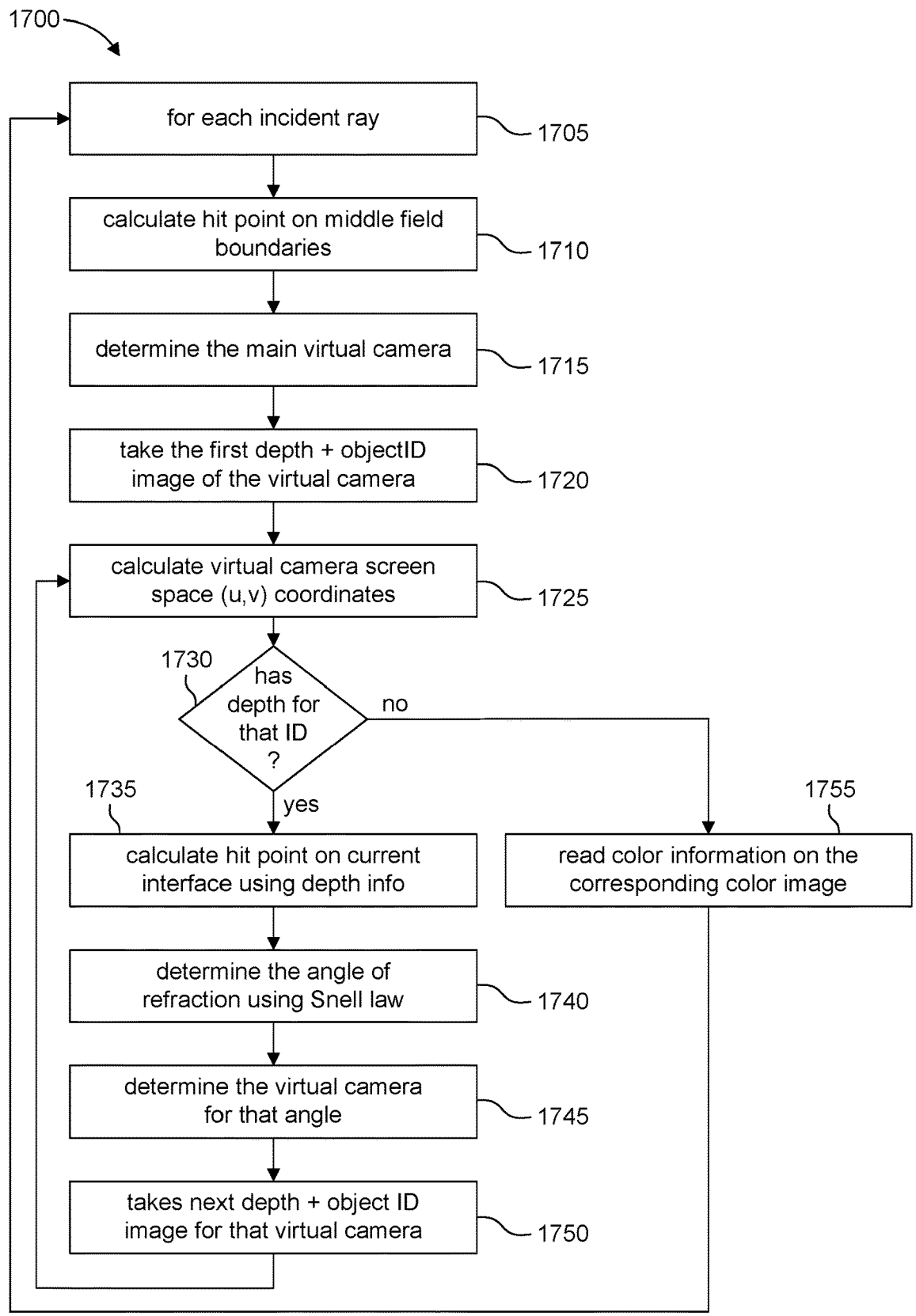
FIG. 17 is a flowchart for obtaining color information for a refractive object.

For a refractive object, the color information is obtained according to the flowchart 1700, of FIG. 17.

At steps 1705 and 1710, for each incident ray a hit point on the middle-field boundaries is calculated.

At step 1715, the position for the main virtual camera is determined.

After step 1715, a first depth and object ID is obtained from the main virtual camera (step 1720) and virtual camera screen space (u, v) coordinates are determined (step 1725).

At step 1730, if there is depth information for the object ID, calculate the hit point on the current interface using the depth information (step 1735), determine the angle of refraction using Snell's law (step 1740) and determine the virtual camera for the angle of step 1740 (step 1745).

After step 1745, a subsequent depth and object ID image is taken for the camera and steps 1710-1725 are repeated.

After step 1725, if there is no depth information for the object ID (step 1730), color information is read on the corresponding image (step 1755).

Figure 18:
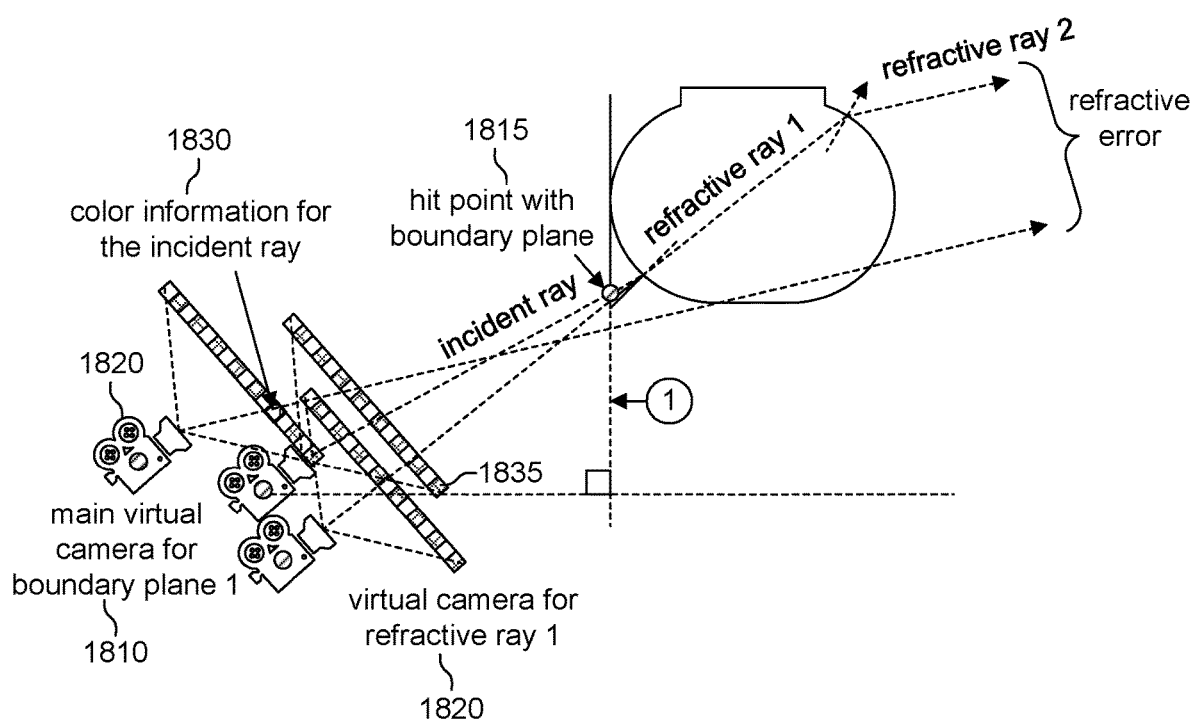
FIG. 18 is an illustration for obtaining color information for a refractive object according to the flowchart of FIG. 17, for the fishbowl shown in FIG. 3.

An illustration of the flowchart of FIG. 17, for the fishbowl is illustrated in FIG. 18. Incident rays from camera 1810 are used to calculate the hit point 1815 (step 1710) and determining the position for main virtual camera 1810.

Thereafter, color information 1830, 1835 is generated around main virtual camera 1810 (step 1755) and additional virtual cameras 1820.

For shadow rays, once the color information has been retrieved, the intersection point between the camera primary ray and the object is checked as to whether it is lit or not. For each light of the 3D scene, shadow rays are generated toward the light geometry. For each shadow ray, the retrieval of the shadow information follows the flowchart shown in FIG. 19.

At steps 1910 and 1920, for each shadow ray the light virtual camera is determined.

After step 1920, a hit point is projected in virtual camera screen space (step 1930).

At step 1940, depth information is read. At step 1950, if depth distance is yes, the shadow information is true (step 1970). At step 1950, if depth distance is no, the shadow information is false (step 1960).

Figure 19:
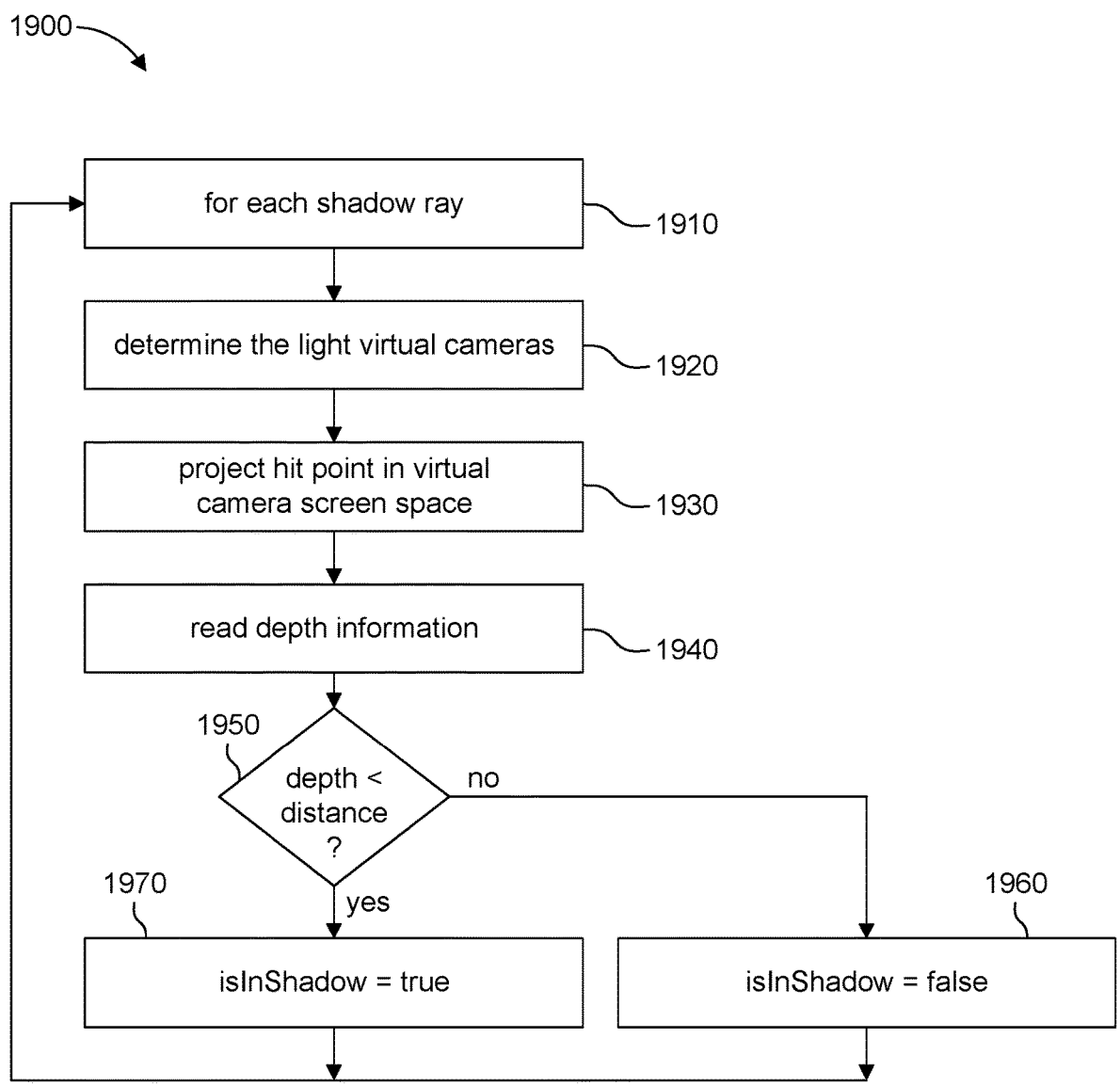
FIG. 19 is a flowchart for the retrieval of shadow information.
Figure 20:
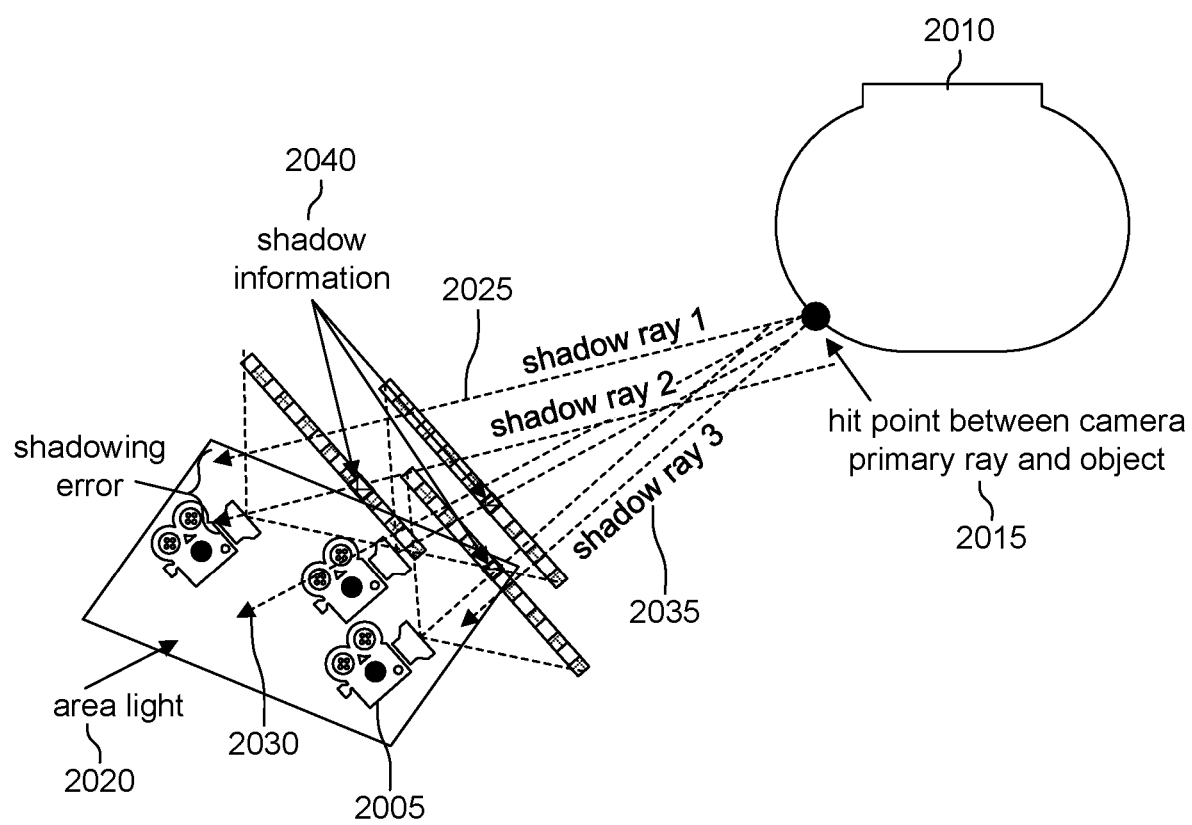
FIG. 20 is an illustration for the retrieval of shadow information according to the flowchart of FIG. 19, for the fishbowl of FIG. 3.

An illustration of the flowchart of FIG. 19, for the fishbowl 2010 is illustrated in FIG. 20. Shadow rays from a hit point 2015 (step 1910) determine the light virtual cameras 2005. Thereafter, depth information is read and shadow information 2040 is generated.

Figure 2B:
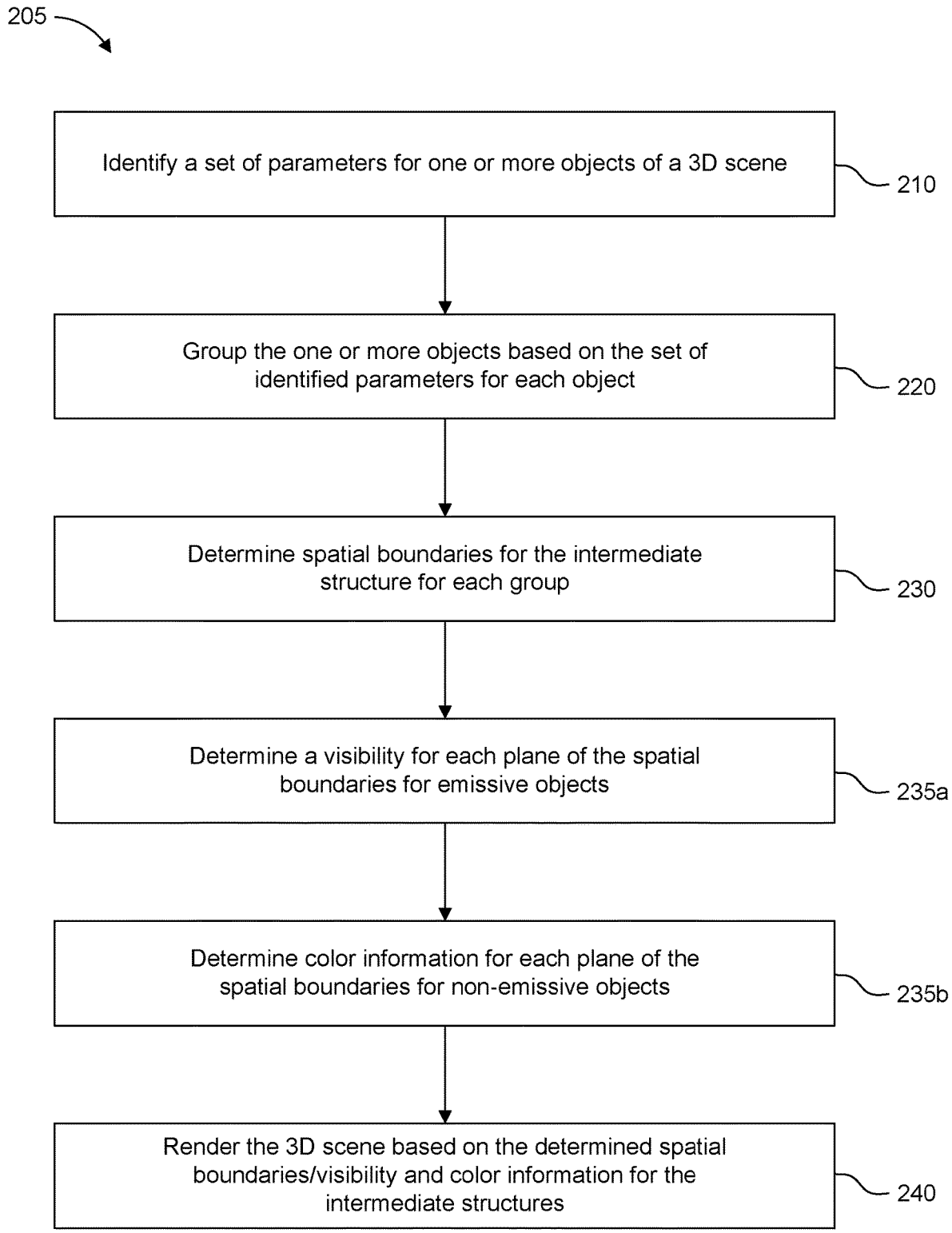
FIG. 2B is a flowchart of a further embodiment of the proposed method illustrated in FIG. 2A for rendering of a virtual object of an AR (augmented reality) or MR (mixed reality) application in a real-world 3D environment.
Figure 2C:
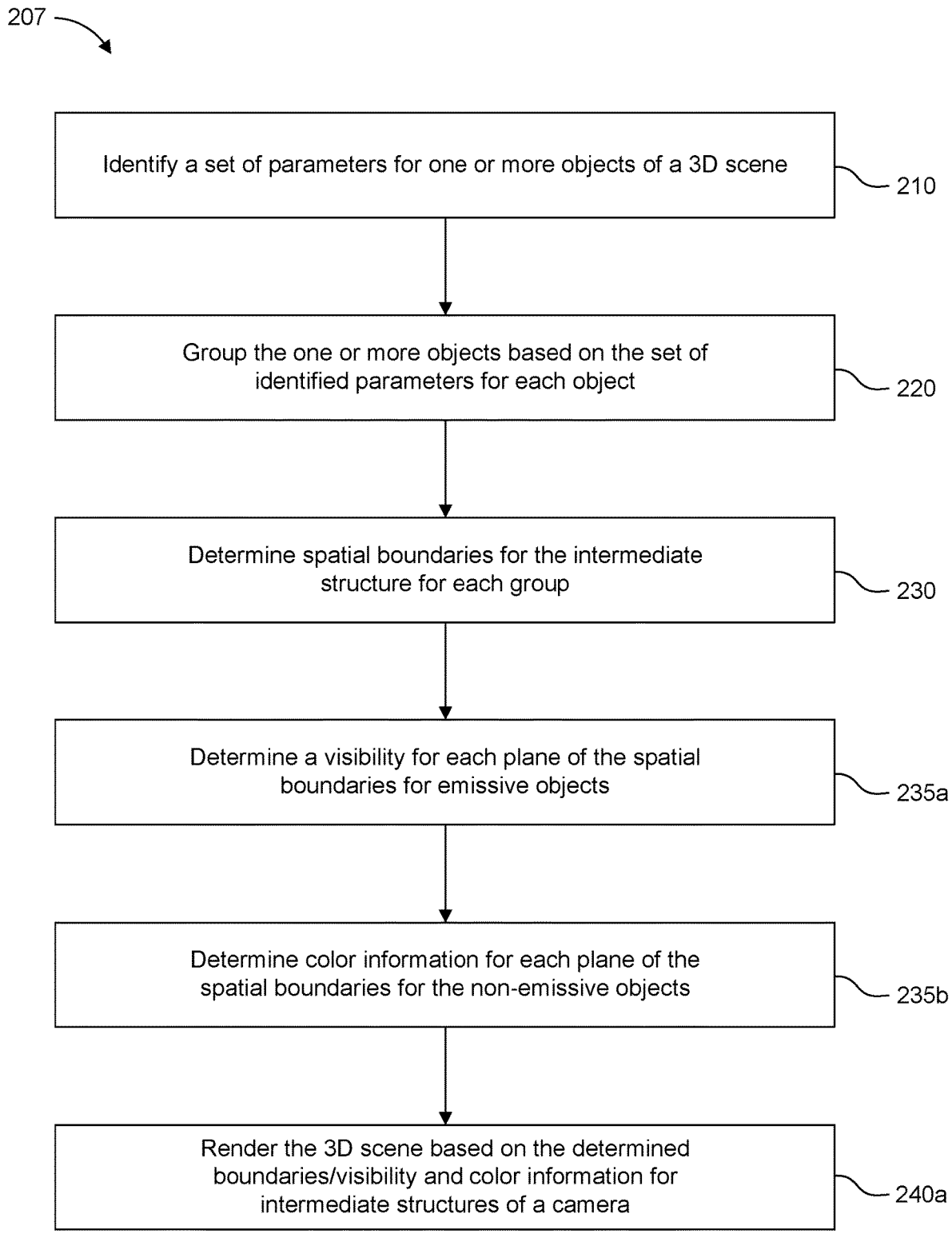
FIG. 2C is a flowchart of a further embodiment of the proposed method illustrated in FIG. 2B for rendering of a virtual object of an AR (augmented reality) or MR (mixed reality) application in a real-world 3D environment.

FIGS. 2B and 2C are flowcharts 205, 207 of further embodiments of the method illustrated in FIG. 2A for rendering of a virtual object of an AR (augmented reality) or MR (mixed reality) application in a real-world 3D environment.

Referring to FIG. 2B, in step 210, a set of parameters for one or more objects of a 3D scene are identified and grouped (step 220). At step 230, a spatial boundary of an intermediate structure for the one or more objects in the scene is determined.

In step 235*a* and step 235*b* in FIG. 2B, after the spatial boundary of an intermediate structure for each of the objects in the scene is determined, a visibility for each plane of the spatial boundaries for emissive objects is determined and color information for each plane of the spatial boundaries for non-emissive objects is determined, respectively. The color information may include, for example, irradiance, radiance, illuminance, luminance and intensity. At step 240, the 3D scene is rendered based on the determined spatial boundary/visibility and color information for the intermediate (middle-field) structures for each of the objects in the scene.

Referring to FIG. 2C, in step 210, a set of parameters for one or more objects of a 3D scene are identified and grouped (step 220). At step 230, a spatial boundary of an intermediate structure for the one or more objects in the scene is determined.

In step 235*a* and step 235*b* in FIG. 2C, after the spatial boundary of an intermediate structure for each of the objects in the scene is determined, a visibility for each plane of the spatial boundaries for emissive objects is determined and color information for each plane of the spatial boundaries for non-emissive objects is determined, respectively. At step 240*a*, the 3-D scene is rendered based on the determined color for the intermediate (middle-field) structures from a camera.

Figure 21:
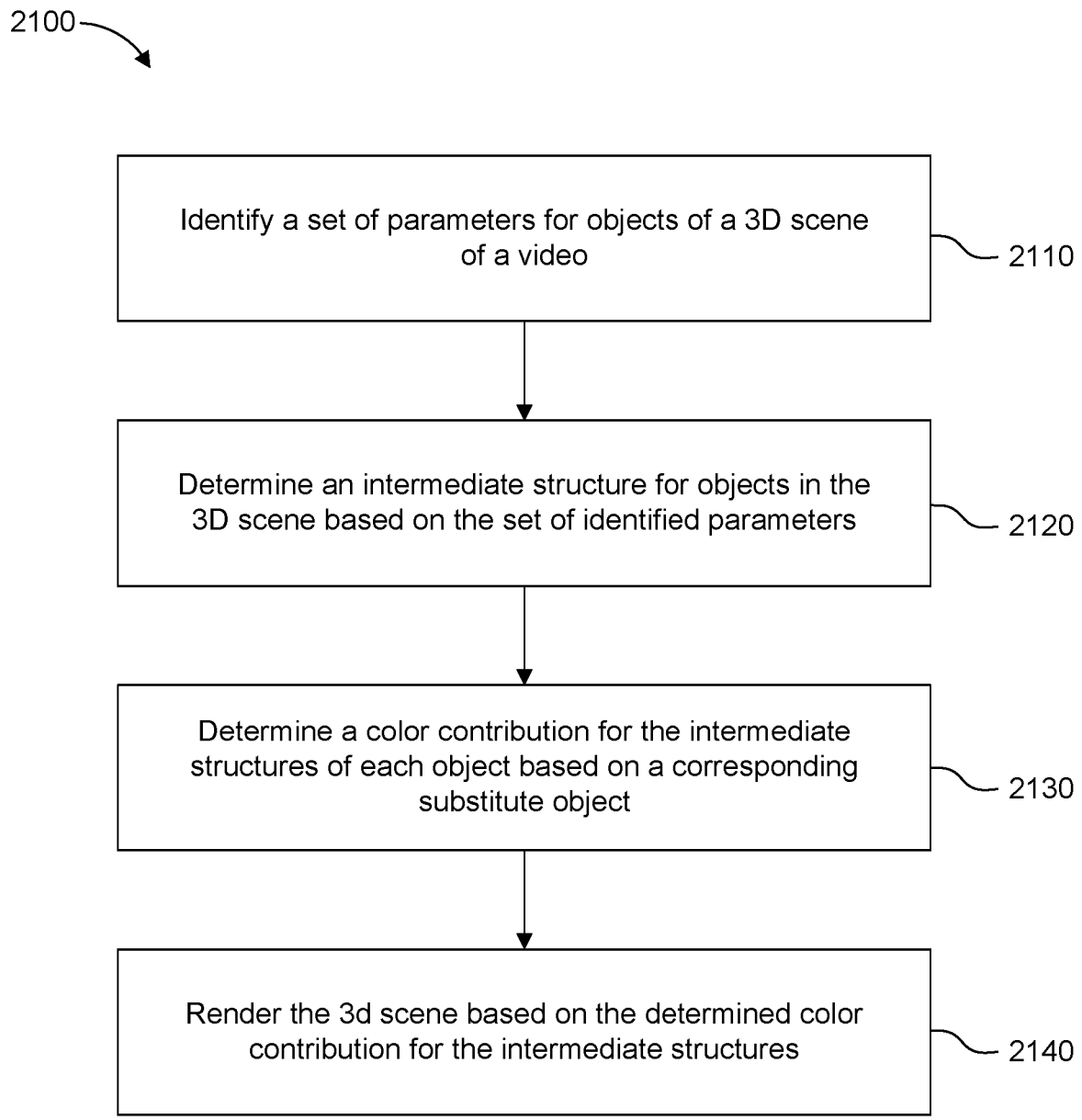
FIG. 21 is a flowchart of another particular embodiment of a proposed method for rendering of a virtual object of an AR (augmented reality) or MR (mixed reality) application in a real-world 3D environment.

FIG. 21 is a flowchart 2100 of another particular embodiment of a proposed method for placement of a virtual object in an AR (augmented reality) or MR (mixed reality) application in a real-world 3D environment. In this particular embodiment, the method includes four consecutive steps 2110 to 2140.

In an exemplary implementation, described below, the method is also carried out by the rendering device 170 (e.g., smartphone, a tablet, or a head-mounted display). In an alternative exemplary implementation, the method is carried out by a processor 110 external to the rendering device 170. In the latter case, the results from the processor 110 are provided to the rendering device 170.

Figure 22:
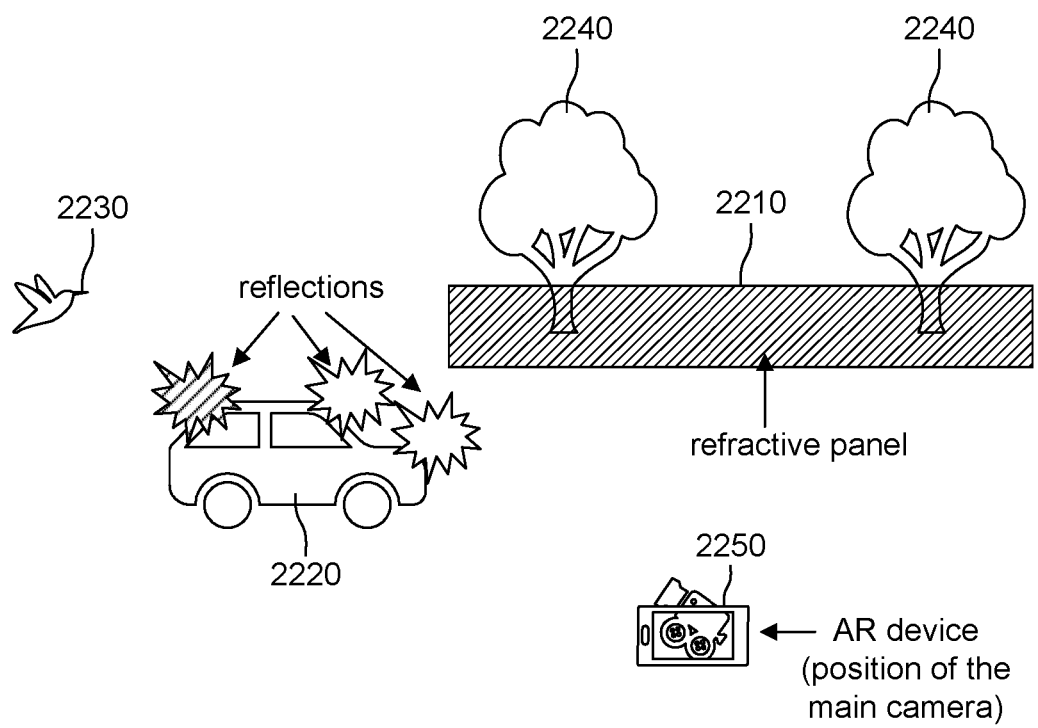
FIG. 22 is an illustration showing a position of a virtual camera as well as a position of a real camera that captures a typical AR scene.

An illustration of a typical AR scene is shown in FIG. 22. The scene shown in FIG. 22 is composed of tangible objects including real objects and virtual objects. An exemplary tangible object that is a real object includes a refractive panel with transparent parts (glass) 2210. Some exemplary tangible objects that are virtual objects include a car 2220 having metallic/glossy non-planar surfaces, a bird 2230 and trees 2240.

An additional virtual object (not shown) may be added to the scene to add realism and to support rendering. An invisible virtual refractive panel representative of the real transparent panel, having the same size and position as refractive panel 2210, is a non-limiting example.

The following sub-sections describe a particular embodiment of the proposed method 2100 of FIG. 21, for placement of a virtual object of an AR (augmented reality) or MR (mixed reality) application in a real-world 3D environment. The particular embodiment provides high-quality rendering for each object of the AR scene displaying a variety of rendering aspects.

In step 2110, a set of parameters for objects of a 3D scene of a video are identified. This step is required for non-light and non-camera objects in the scene and is based on a prior knowledge of the AR scene. Each of the objects in the scene are identified as either real objects or virtual objects in the context of AR, based on the set of parameters.

The set of parameters may include, for example, an environment importance value and an array of N integer values based on the number of reflective/refractive objects in the scene of the video.

The environment importance is related to the object's color contribution from the environment of the 3D scene. An integer value from 0 to 2 may be used for the environment importance value. An environment importance value of 0 indicates that the color contribution from the environment is null or negligible. An environment importance value of 1 indicates that the color contribution from the environment is carried by reflection rays. An environment importance value of 2 indicates that the color contribution from the environment is carried by reflection rays and refraction rays. Identifying the appropriate object environment importance value is straightforward.

The size of the array of N integer values corresponds to the number of reflective/refractive objects that are in the scene (e.g., objects having an environment importance different from 0). The higher the N integer value, the better will be the rendering of the selected object for the related reflective/refractive object. The N integer value corresponds to the number of intermediate (middle-field) images to be generated for the selected object for the related reflective/refractive object.

The array of N integer values is set based on the complexity of the selected object shape as well as the object position and distance with respect to the related reflective/refractive objects. N integer values can be changed if these parameters are changed. The array of N integer values is used to optimize the trade-off between rendering quality and performance (memory cost, frame rate).

Referring to FIG. 22, the set of parameters of the 3D scene objects are as described below. The scene depicted in FIG. 22 has two reflective/refractive objects: the car 2220 and the refractive (glass) panel 2210. Thus, the size of the array of N integer values equals 2. The first element of the array corresponds to the array value for the car 2220. The second element of the array corresponds to the array value for the refractive (glass) panel 2210.

The car 2220 has an environment importance value of 1 because there is a color contribution from reflective rays. The array of N integer values for the car 2220 is [−1, 1]. The first element of the array is set to −1, because the car cannot contribute color to itself. Setting this element to −1 makes this value not relevant. The second element of the array indicates that a single intermediate (middle-field) image will be generated for collecting rays from the car 2220 to the refractive (glass) panel 2210.

The bird 2230 has an environment importance value of 0, as there is no color contribution from the environment. The array of N integer values for the bird 2230 is [2, 1]. The first element of the array indicates that two (2) intermediate (middle-field) images will be used for collecting rays from the bird to the reflective/glossy car 2220. The second element of the array indicates that a single intermediate (middle-field) image will be generated for collecting rays from the bird 2230 to the refractive (glass) panel 2210.

The refractive (glass) panel 2210 has an environment importance value of 2 because there is a color contribution from both reflective rays and refractive rays. The array of N integer values for the refractive (glass) panel 2210 is [1, −1]. The first element of the array indicates that a single intermediate (middle-field) image will be generated for collecting rays from the refractive (glass) panel 2210 to the car 2220. The second element of the array is set to −1, because the refractive (glass) panel 2210 cannot contribute color to itself. Setting this array element to −1 makes this value not relevant.

The trees 2240 have an environment importance value of 0, as there is no color contribution from the environment. The array of N integer values for the trees 2240 is [2, 3]. The first element of the array indicates that two (2) intermediate (middle-field) images will be used for collecting rays from the trees 2240 to the reflective/glossy car 2220. The second element of the array indicates that three (3) intermediate (middle-field) images will be generated for collecting rays from the trees 2240 to the refractive (glass) panel 2210.

Referring to step 2120 of FIG. 21, for one particular embodiment, an intermediate structure for selected objects in the 3D scene along with corresponding substitute (proxy) objects for each selected object based on the set of identified parameters from step 2110 is determined. Step 2120 is applicable to objects whose environment importance value is non-zero. Such objects will have a color contribution from the environment (e.g., surrounding scene objects). This step will be further discussed below with respect to the flowchart of FIG. 23.

In one exemplary embodiment, a corresponding substitute (proxy) object is used to represent the selected object. The corresponding (proxy) object should preferably have a primitive shape, such as, for example, a bounding box structure. The primitive shape defines an area for the non-light and non-camera objects in the 3D scene.

One technique known as axis-aligned bounding box (AABB) may be used to define the primitive shape. AABB is advantageous as it only requires comparisons of coordinates, it allows the quick exclusion of coordinates that are far apart.

The AABB for a given point set (S) is typically its minimum area subject to the constraint that the edges of the box are parallel to the coordinate (Cartesian) axes. It is the Cartesian product of n intervals, each of which is defined by the minimal and maximal of the corresponding coordinate for the points in S.

The selected object for which the intermediate structure is determined is a source object. The source object has a source proxy (corresponding substitute) object. For the selected object, surrounding scene objects are target objects. Each target object also has a target proxy (corresponding substitute) object.

At step 2130, a color contribution of the intermediate structure for each selected object is determined based on the corresponding substitute (proxy) object.

Referring to step 2140 of FIG. 21, the 3D scene is rendered based on the intermediate (middle-field) structures for each of the selected one or more objects in the scene. The rendering of the 3D scene is performed by a camera 2250 (FIG. 22) using ray tracing. The intermediate (middle-field) structures are used as acceleration structures instead of traditional spatial partitioning acceleration structures (e.g., Bounding Volume Hierarchy (BVH)). In the exemplary embodiment, the raytraced geometries are equivalent to raytracing their corresponding middle-field image ray type. Steps 2130 and 2140 will be further discussed below with respect to the flowchart of FIG. 28.

Available ray types commonly used for raytracing are:
Camera rays: the initial rays that come out of the camera.
Secondary rays: (next rays) generated when interacting with materials (e.g., reflection, refraction).

An exemplary mathematical definition for a ray group is:

$$\Sigma_i^n Ri(\theta, \psi, W) P,$$

where for a ray (Ri) in the group, P is the origin or destination of the rays in the group, the number of rays corresponds to the number of images which represent the intersected geometry group. $\theta$, $\psi$ are the rotation of a ray, and W is the approximation of the lobe size representing the divergence of the rays in the group.

The larger the lobe (W), the more blurred/anti-aliased the ray group if the ray is a camera ray. The larger the lobe (W), the rougher the ray group if the ray is a secondary ray (reflection/refraction) and the softer the ray group if the ray is a shadow ray. The minimum lobe size equates to 0 divergence. For such an instance, then one ray is enough to sample the domain (camera ray, reflection ray, refraction ray, shadow ray), thus n=1 for middle-field images.

For camera primary rays, the rendering of the camera primary rays is done by activating the middle-field structure attached to the camera. The generated image corresponds to the rasterized image of the scene viewed by the camera. The content of each image pixel is a vector of 3 float components storing the color information (e.g., red, green and blue color values) of the closest hit object.

For secondary rays, the rendering is performed for each visible object from the current camera. One exemplary embodiment for determining this visibility, is to check if the object bounding box intersects the camera frustrum (i.e., using for example, a viewing frustrum culling technique). Initially, the middle-field structure(s) attached to the object is/are activated. Then the color information is retrieved by an adequate look-up of the generated images.

Figure 23:
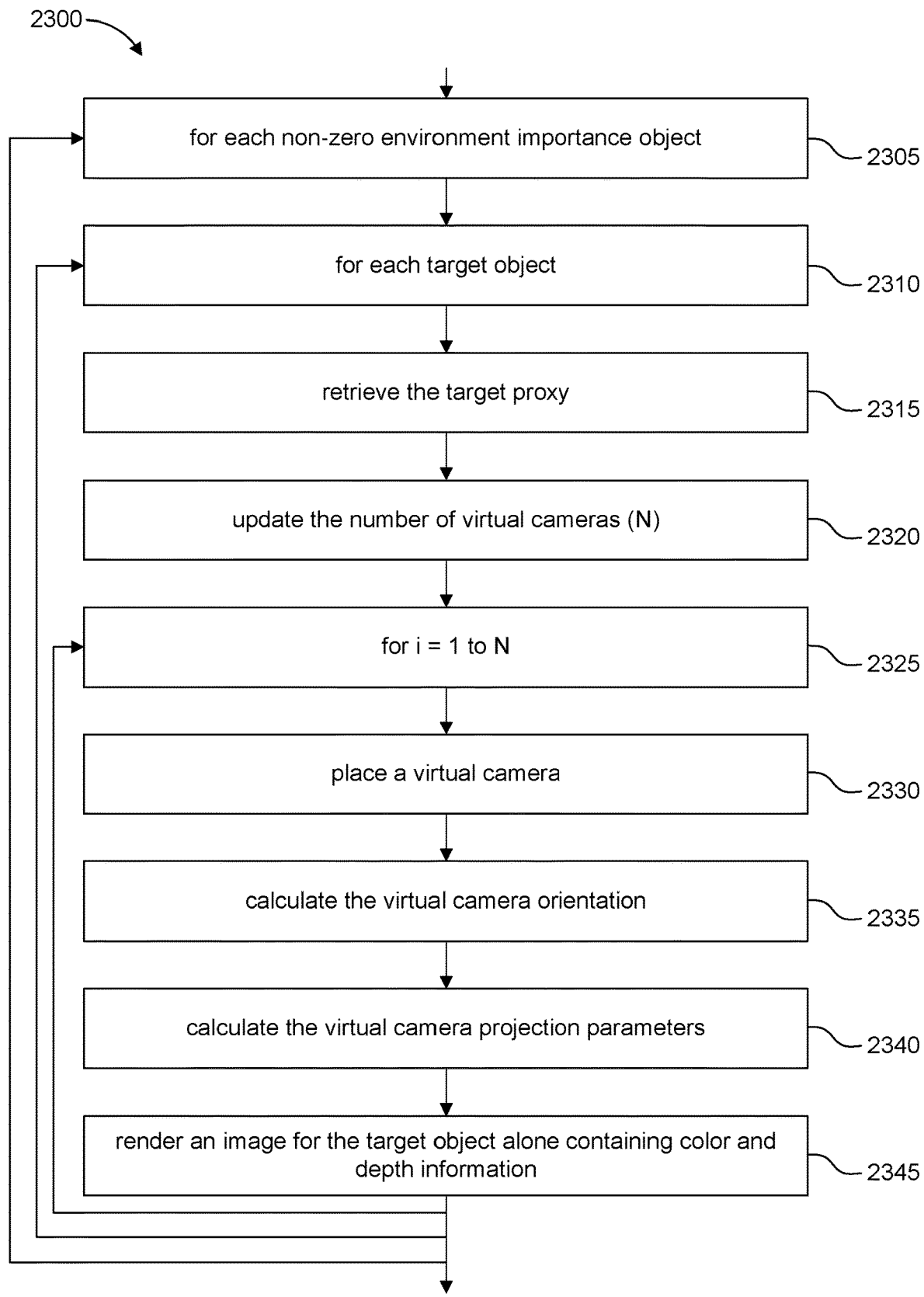
FIG. 23 is a flowchart for the determination of the spatial boundaries of the intermediate structure(s) for selected object(s) in the 3D scene along with a corresponding (proxy) object.

Referring again to step 2130 of FIG. 21, the intermediate structure (middle-field) images are generated according to the flowchart depicted in FIG. 23.

At step 2305, each object in the 3D scene having a non-zero environment importance value is selected as a source object. Objects surrounding the source object called target objects are identified in step 2310. At step 2315, target proxy (corresponding substitute) objects are retrieved.

Figure 24:
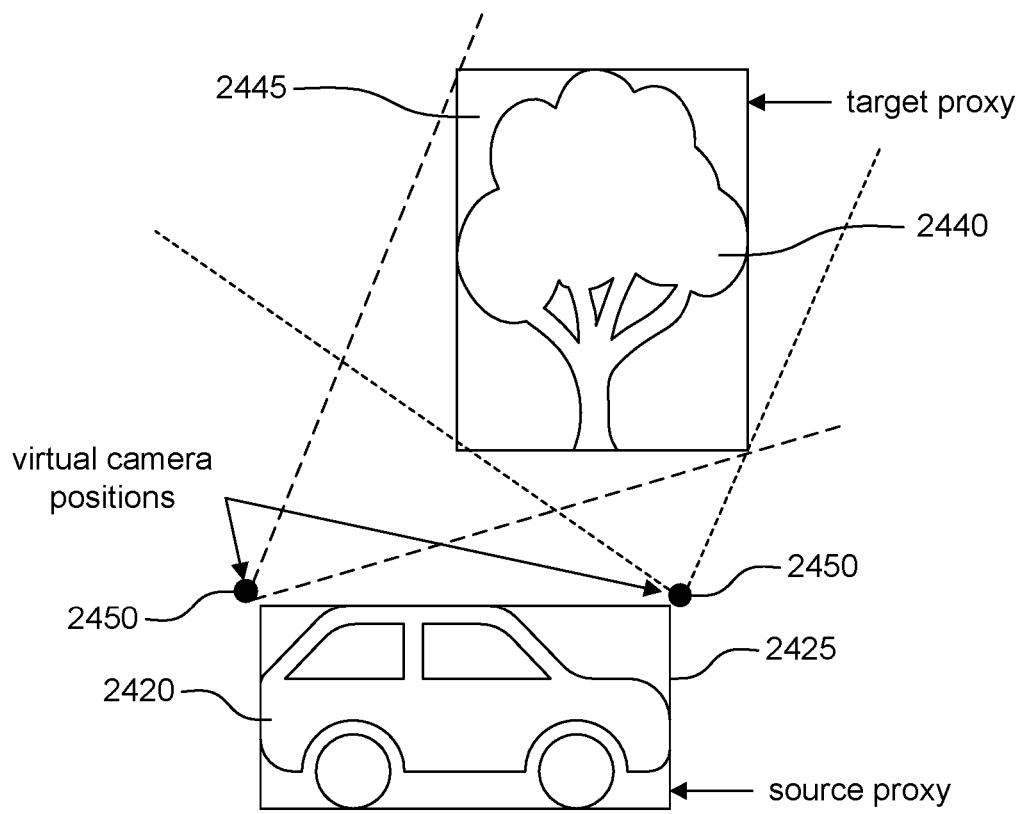
FIG. 24 is an illustration showing source and target objects along with virtual camera placements for generating an intermediate structure image.

Referring to FIG. 24, the exemplary source object 2420 of step 2305 is identified as the car, previously shown in FIG. 22. The source object 2420 has a source proxy (corresponding substitute) object 2425 that has a box (3D) shape. The surrounding scene object for the source object 2420 is the tree which is identified as the target object 2440. The target object 2440 has a target proxy (corresponding substitute) object 2445 which also has a box (3D) shape.

Referring again to FIG. 23, the number of virtual cameras is updated at step 2320. At step 2325, the number of virtual cameras is based on the number of intermediate (middle-field) images that will be used for collecting rays from the target object to the source object (trees to the car) and is an integer. Thereafter, at step 2330 the virtual cameras are placed in the scene to maximize the capture of the rays coming from the target object to the source object.

If only one intermediate (middle-field) image is generated for the target object (N=1), the virtual camera can be placed at the center of the source proxy (corresponding substitute) object. In FIG. 24, two virtual cameras 2450 for the car are placed along each side of the source proxy (corresponding substitute) object 2425. The two virtual cameras 2450 are used for generating the intermediate (middle-field) images of the tree (target object) for the car (source object).

At step 2335 of FIG. 23, the orientation of the virtual camera 2450 is calculated. Referring to FIG. 24, each target object 2440 is rendered individually by orienting the virtual camera 2450 toward its own target proxy object 2445 center point (not shown) and by setting appropriate projection parameters to generate an intermediate (middle-field) image.

In FIG. 23, the virtual camera 2450 projection parameters are calculated, at step 2340. The projection parameters include near plane distance, far plane distance and Field-of-View (FOV) angle.

Figure 25:
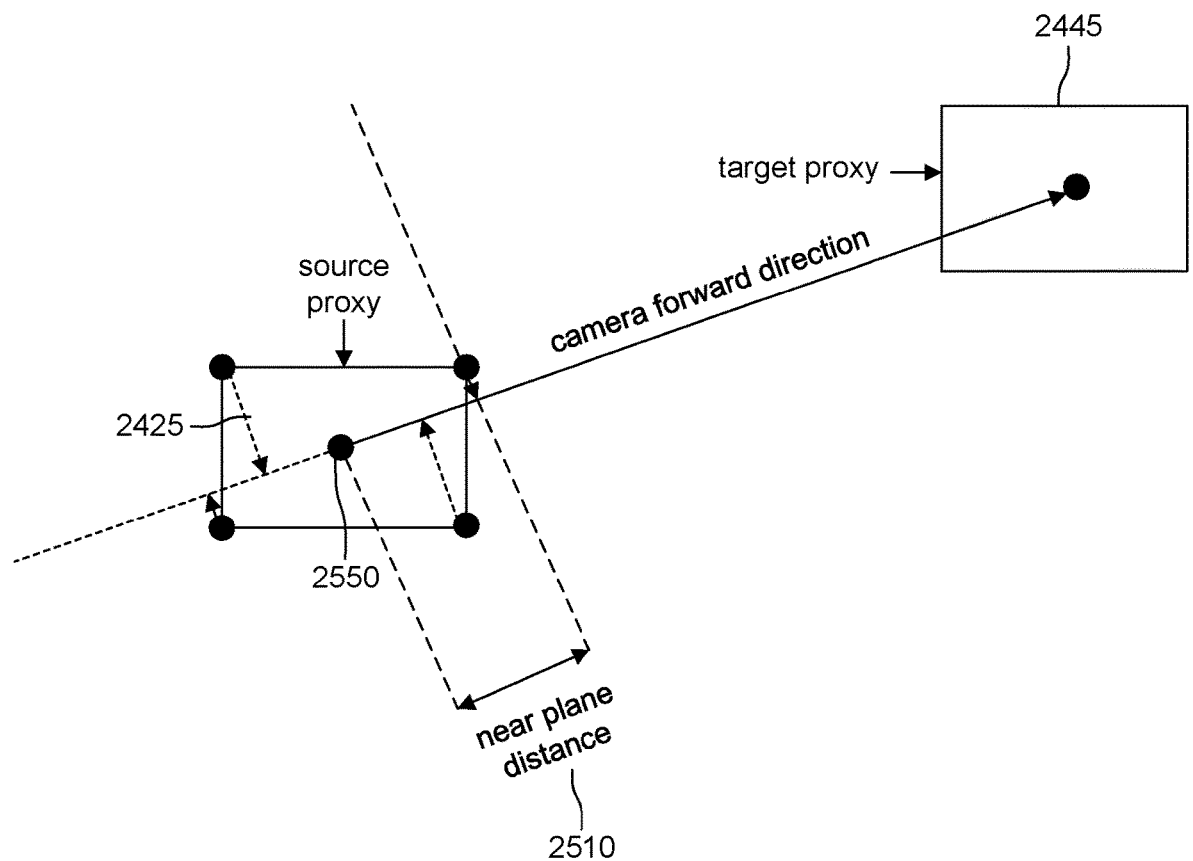
FIG. 25 is an illustration showing virtual camera near plane distance determination for camera perspective projection.

Referring to FIG. 25, the near plane distance 2510 is determined by projecting the source proxy (corresponding substitute) object 2425 toward the virtual camera forward direction and by taking the maximum distance value to the virtual camera. For simplicity, in this example, a single virtual camera position 2550 (N=1) was assumed for the target object and was placed at the center of the source proxy object.

The far plane distance can either be user defined or set to the far plane distance of the main camera. In one exemplary embodiment, the far plane distance is set to the distance from the virtual camera attached to the AR device.

Figure 26:
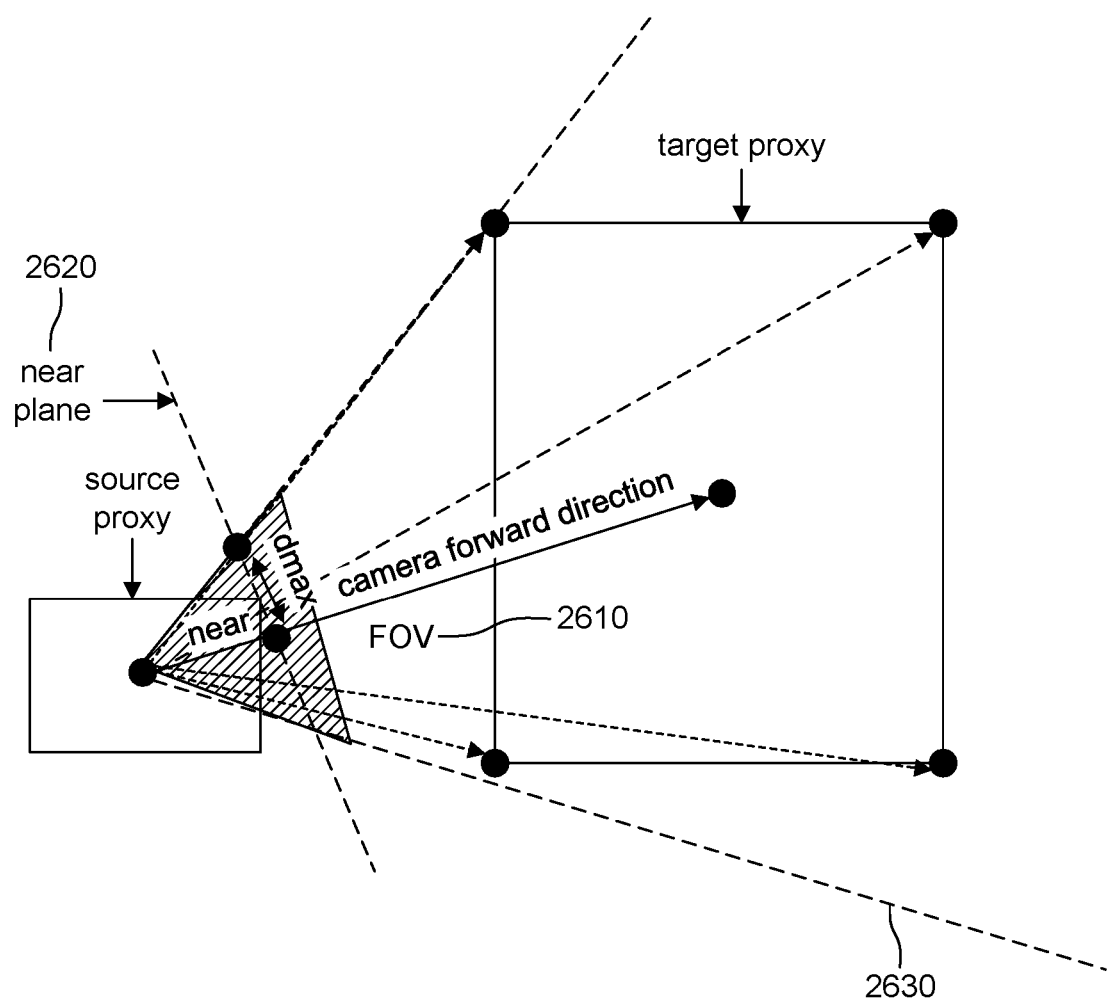
FIG. 26 is an illustration showing virtual camera Field-of-View (FOV) angle determination for camera perspective projection.

Referring to FIG. 26, the Field-of-View (FOV) angle 2610 is determined by identifying the intersection of the (target proxy boundary—virtual camera position) lines 2630 with the virtual camera near plane 2620 and by taking the angle that includes all of the intersection points.

$$\text{Field-of-View(FOV)}=2*\arctan(d_{max}/\text{near})$$

At step 2345 of FIG. 23, an intermediate (middle-field) image for the target object is determined containing both color and depth information. In one exemplary embodiment, the information is stored in a vector of four (4) components—red, green and blue color information and a value for the depth information.

Figure 27:
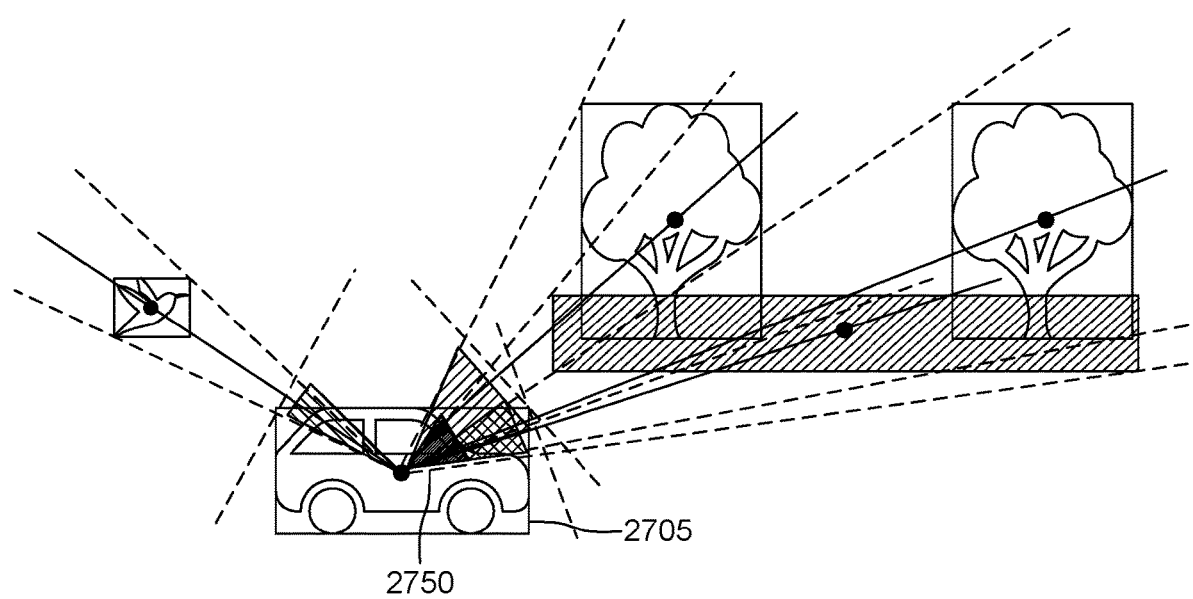
FIG. 27 is an illustration of the intermediate (middle-field) image generation for the car shown in FIG. 22, assuming an N value of 1 for each target object.

In one exemplary embodiment illustrated in FIG. 27, color information for the car object of the scene depicted in FIG. 22 will be determined. For FIG. 27, an N value of 1 is assumed for all of the target objects, such that the virtual camera 2750 is placed at the center of the source proxy (corresponding substitute) object 2705. The color information is determined according to the flowchart shown in FIG. 28.

At step 2805, for each object having a non-zero environment importance value, a determination as to whether such object is refractive, is made at step 2810. Step 2810 is important because there is a need to distinguish reflective/glossy objects from refractive objects when calculating the outgoing rays therefrom.

For reflective/glossy objects, at step 2815, a Bidirectional Scattering Distribution Function (BSDF) lobe is sampled to get the outgoing ray determinations. The starting position, direction and relative energy (power) information for each ray is obtained.

For refractive objects, at step 2820, the Bidirectional Scattering Distribution Function (BSDF) lobe is sampled to get outgoing ray determinations for each air/material interface. For refractive objects, the outgoing ray determination is complex because each incoming ray generates a variety of outgoing rays. The outgoing rays depend on the incoming ray direction, the refractive object geometry and the index of refraction for such object.

Figure 29:
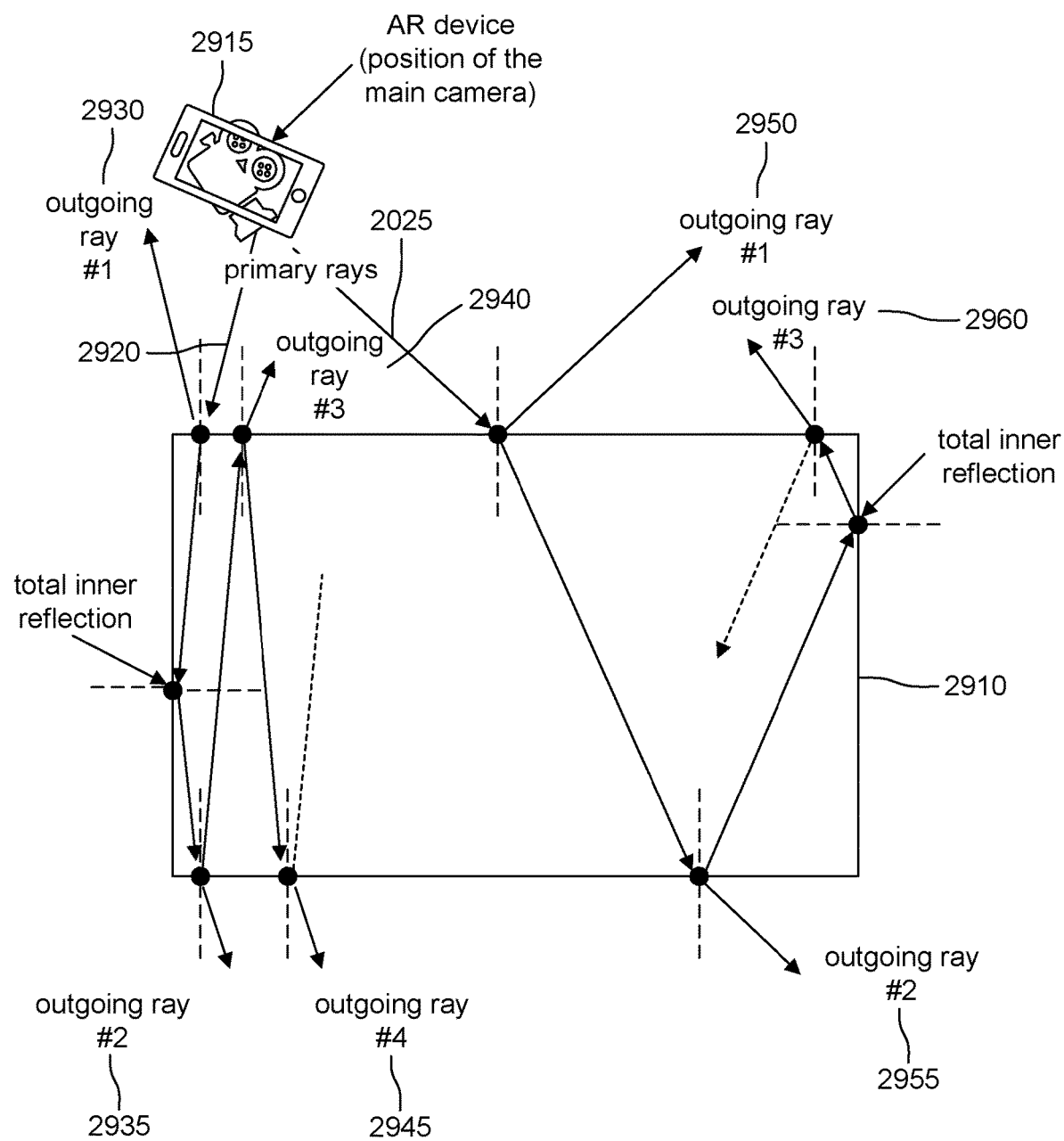
FIG. 29 is an illustration showing several outgoing rays for an exemplary refractive box geometry.

An exemplary illustration of several outgoing rays for a refractive box geometry 2910 is shown in FIG. 29. The box geometry shown in FIG. 29 is a fully analytical primitive shape such that the object can be fully analyzed to calculate intersection points and determine a normal vector at this point for any ray. Other suitable primitive shapes include, for example, spheres, cylinders or procedural objects. For such primitive shapes, On-the-Fly exact calculation of the outgoing rays can be performed.

In FIG. 29, an AR device 2915 provides two (2) primary rays 2920, 2925. For primary ray 2920 there are four (4) outgoing rays 2930, 2935, 2940, 2945. For primary ray 2925 there are three (3) outgoing rays 2950, 2955, 2960.

Figure 30:
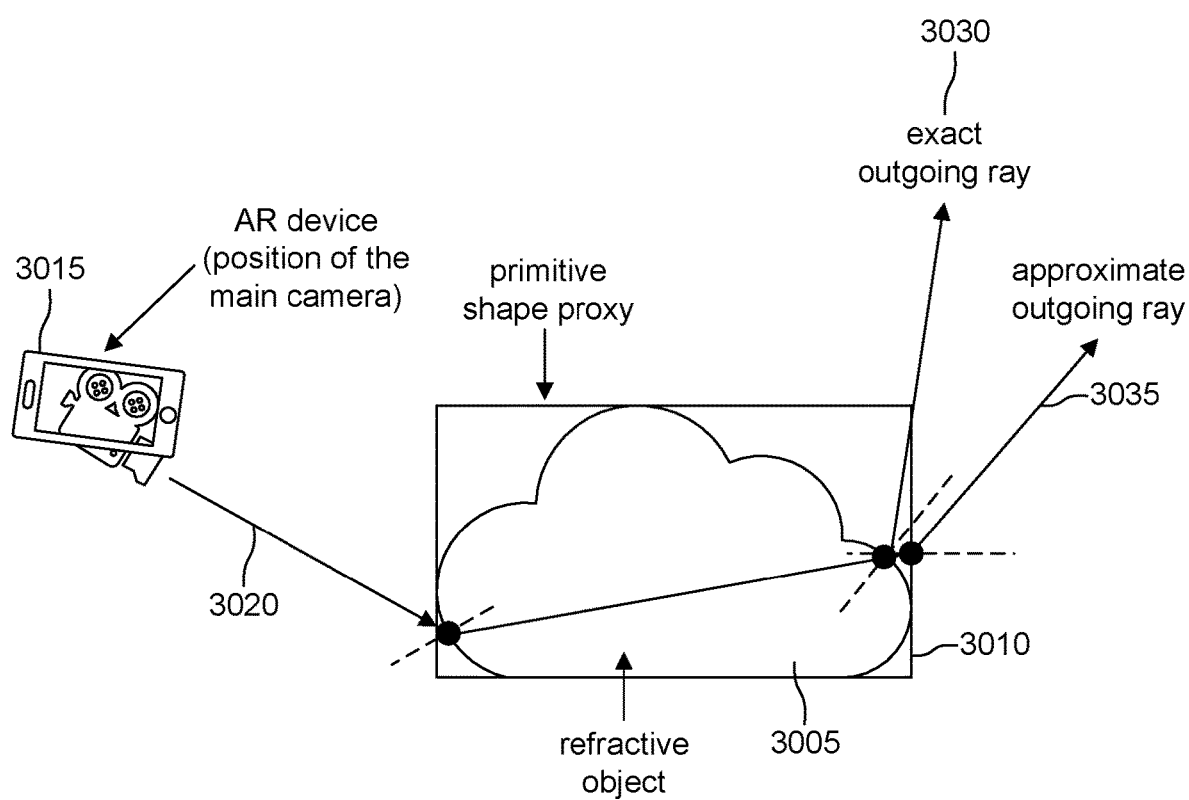
FIG. 30 is an illustration of an exemplary corresponding substitute (proxy) object useful for enabling outgoing ray calculations.

FIG. 30 is an illustration of an object geometry 3005 that is not analytical. For such a situation, the corresponding substitute (proxy) object geometry 3010 is used to calculate intersection points and to determine a normal vector at this point for any ray. In one exemplary embodiment, the corresponding substitute (proxy) object geometry could be the same as the source/target corresponding substitute (proxy) object. For the corresponding substitute (proxy) object geometry, On-the-Fly exact calculation of the outgoing rays can be performed.

In FIG. 30, an AR device 3015 provides one (1) primary ray 3020. For primary ray 3020 there are two (2) outgoing rays 3030, 3035. Ray 3030 is the exact outgoing ray and ray 3035 is the approximate outgoing ray. There is not enough information to calculate the exact outgoing ray 3030 as it is theoretical, so the approximate outgoing ray 3035 is used. The On-the Fly calculation introduces some errors in the outgoing ray direction of the approximate outgoing ray 3035 with respect to the color contribution retrieval, but such errors are hardly noticeable.

Additionally, for one exemplary embodiment, a user-defined nbOfBounces parameter may be introduced. The nbOfBounces parameter limits the number of air/material interfaces considered when calculating the outgoing rays. For example, an nbOfBounces=1 corresponds to the reflected rays of the first air/material interface only (e.g., reflective object with absorption). An nbOfBounce=2 corresponds to the reflected rays of first air/material interface and the transmitted rays of the second material/air interface.

Figure 28:
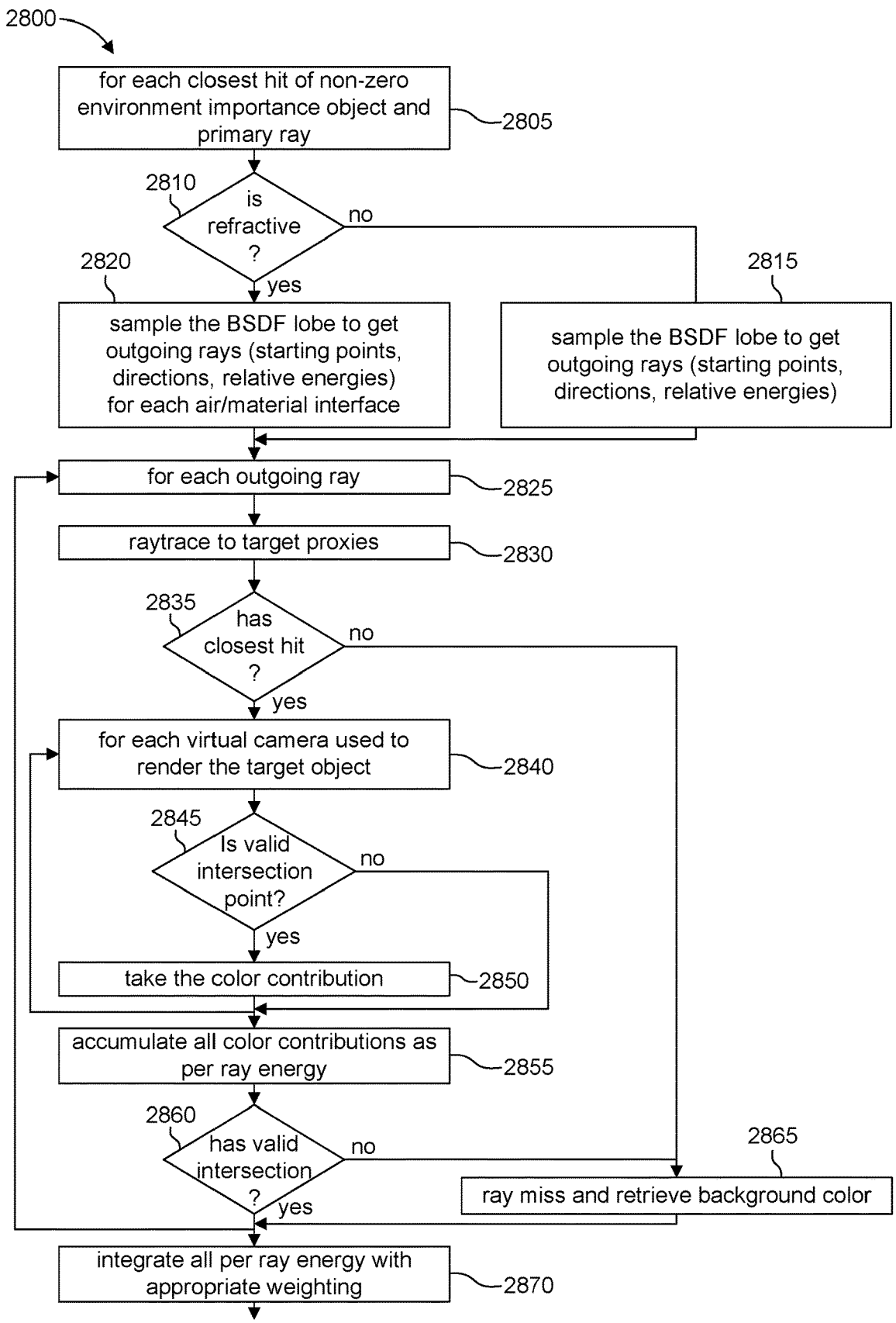
FIG. 28 is a flowchart for the retrieval of color information for reflective/glossy objects and refractive objects.

Referring to steps 2825 and 2830 of FIG. 28, each outgoing ray calculated from steps 2815 and 2820, is ray traced to the corresponding substitute (proxy) target objects.

Thereafter, the color information is determined as described in steps 2835 to 2850 of FIG. 28. Steps 2835 to 2850 will be discussed in greater detail with respect to FIG. 31.

At step 2830 of FIG. 28, outgoing rays are ray traced to the proxy target objects. When ray tracing the target proxies to determine the nearest intersection point, refined versions of the target proxies may optionally be used. Refined versions are more compact which increases the accuracy of the intersection test.

Figure 31:
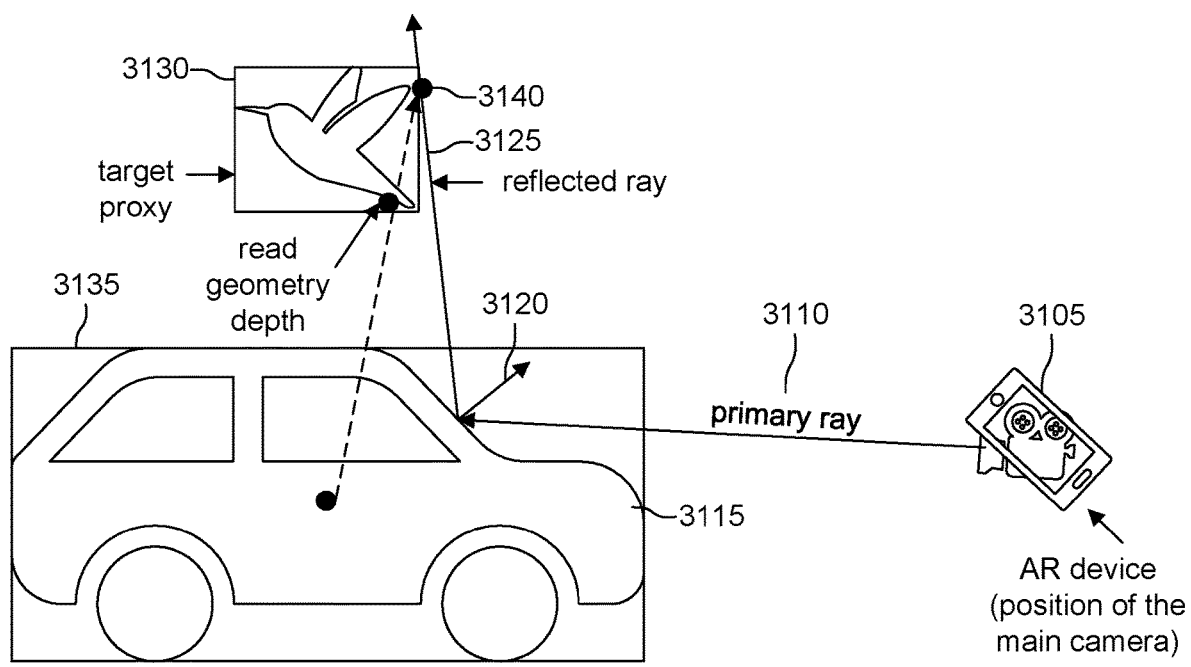
FIG. 31 is an illustration of the comparison between the depth of the target proxy intersection point and the read geometry depth.

Referring to FIG. 31, a primary ray 3110 from the AR device 3105 (step 2840 of FIG. 28) is reflected from the source object (car) 3115. Outgoing ray 3120 is directed away from the target proxy (bird) 3130, so only background color information is obtained, according to step 2865 of FIG. 28. Outgoing ray 3125 is reflected toward the target proxy 3130 and has an intersection point 3140.

At step 2845 of FIG. 28, a determination as to whether the intersection point is valid is made. The criteria for determining a valid intersection point is:
- the intersection point is inside the frustrum of the virtual camera used to render the current target object
- a target geometry is hit inside the target proxy (e.g., the read depth value is not equal to the virtual camera far plane distance)
- the depth of the target proxy intersection point is lower than the read geometry depth to avoid ghost visual artefacts.

Referring to FIG. 31, the reflected outgoing ray 3125 hit the target proxy at intersection point 3140 and a valid target geometry depth can be read. However, the reflected outgoing ray 3125 does not intersect the target geometry (bird). Additionally, as the depth of the target proxy intersection point 3140 is higher than the read geometry depth 3135, intersection point 3125 is not a valid intersection point.

At step 2850 of FIG. 28, for those intersection points that are valid, the color contribution is taken. At step 2855, all color contributions are accumulated as per ray energy. The accumulation of the color contributions of all virtual cameras for the hit target object requires the calculation of blending weights. One example for accumulations of the color contributions uses the local cubemaps blending weight calculation proposed by "S. Lagarde in Image-based Lighting approaches and parallax-corrected cubemap", Siggraph 2012, Los Angeles, CA, USA, August 2012.

Figure 32:
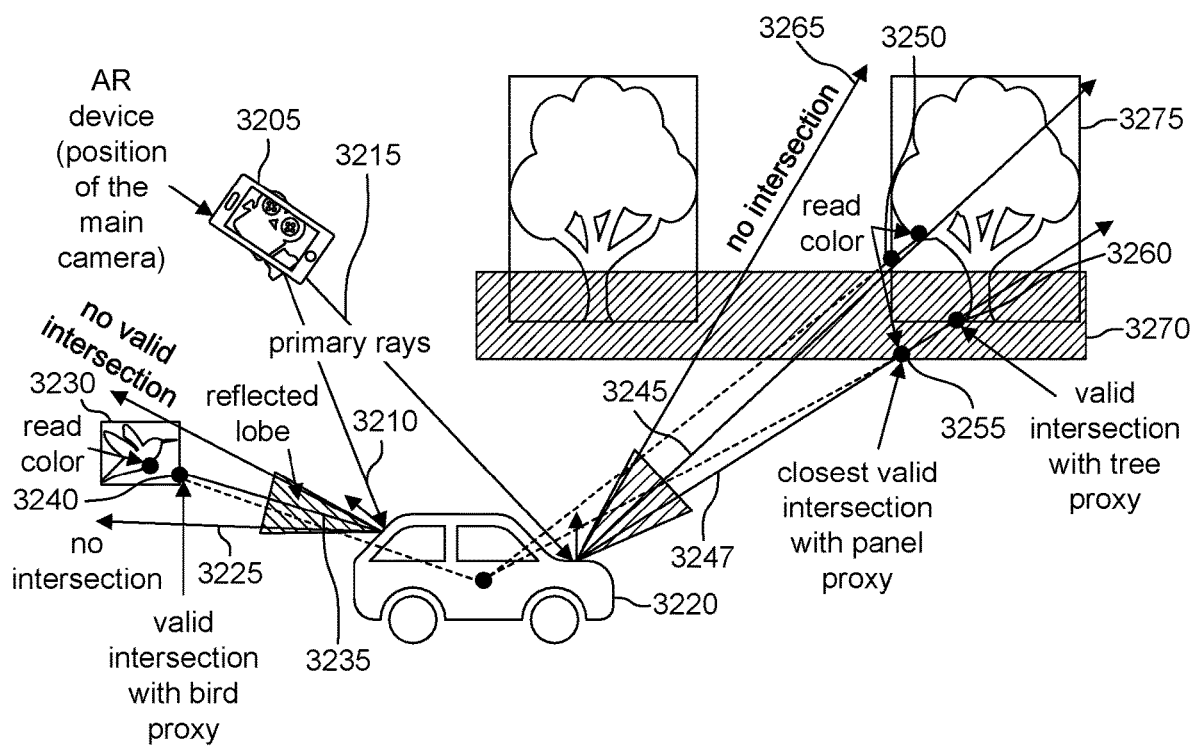
FIG. 32 is an illustration depicting color information retrieval for the glossy surfaces of the car shown in FIG. 22.

FIG. 32 is an illustration depicting color information retrieval for the glossy surfaces of the car shown in FIG. 22. In FIG. 32, two (2) primary rays 3215, 3210 from the AR device 3205 (step 2840 of FIG. 28) are reflected from the source object (car) 3220. Outgoing ray 3225 is directed away from the target proxy (bird) 3230, so only background color information is obtained, according to step 2865 of FIG. 28. Outgoing ray 3235 is reflected toward the target (bird) proxy 3230 and has an intersection point 3240 which is a valid intersection point.

The reflected outgoing rays 3245, 3247 hit the target proxy at intersection points 3250, 3255, 3260 providing valid intersection with the panel proxy 3270 and tree proxy 3275, so color information for the glass panel and the tree can be read. However, the ray 3265 is the normal vector at the local surface and does not intersect the target geometries (tree and glass panel).

Although the present embodiments have been described hereinabove with reference to specific embodiments, the present disclosure is not limited to the specific embodiments, and modifications will be apparent to a skilled person in the art which lie within the scope of the claims.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged, where appropriate.

What is claimed is:

1. A method, comprising:
   identifying a set of parameters for one or more virtual objects in a 3D scene of a video;
   determining a spatial boundary of an intermediate structure for each of the one or more virtual objects in the 3D scene based on a respective object type and a respective object importance weight parameter;
   determining an illumination contribution for each plane of the spatial boundary of the intermediate structure for each of the one or more virtual objects in the 3D scene; and
   generating the 3D scene of the video based on the determined spatial boundary and the determined illumination contribution for each plane of the spatial boundary of the intermediate structure for each of the one or more objects in the 3D scene.

2. The method of claim 1, wherein the set of parameters comprises an object planarity, object refractivity, and object importance in the 3D scene of the video.

3. The method of claim 1, further comprising grouping said one or more objects based on the identified set of parameters.

4. The method of claim 1, wherein the spatial boundary of the intermediate structure comprises a plane or a set of planes.

5. The method of claim 4, wherein the spatial boundary of the intermediate structure is subdivided.

6. The method of claim 1, wherein the spatial boundary comprises a bounding box, and wherein the intermediate structure comprises a middle-field structure.

7. The method of claim 1, wherein the one or more virtual objects comprise one or more of an invisible virtual mirror, an invisible virtual light, or an invisible glossy plane.

8. The method of claim 1, wherein the 3D scene of the video further comprises one or more real objects.

9. The method of claim 1, wherein the object type is one of a light, a camera, or other object.

10. The method of claim 1, wherein determining the illumination contribution comprises at least one of:
    determining a visibility for each plane of said spatial boundary for emissive objects; and
    determining color information for each plane of said spatial boundary for non-emissive objects.

11. A device for rendering a 3D scene of a video, comprising:
    at least one processor, configured to:
    identify a set of parameters for one or more virtual objects in a 3D scene of a video;
    determine a spatial boundary of an intermediate structure for each of the one or more virtual objects in the 3D scene based on a respective object type and a respective object importance weight parameter;
    determine an illumination contribution for each plane of the spatial boundary of the intermediate structure for each of the one or more virtual objects in the 3D scene; and
    generate the 3D scene of the video based on the determined spatial boundary and the determined illumination contribution for each plane of the spatial boundary of the intermediate structure for each of the one or more objects in the 3D scene.

12. The device of claim 11, wherein the set of parameters comprises an object planarity, object refractivity, and object importance in the 3D scene of the video.

13. The device of claim 11, further comprising grouping said one or more objects based on the identified set of parameters.

14. The device of claim 11, wherein the spatial boundary of the intermediate structure comprises a plane or a set of planes.

15. The device of claim 11, wherein the spatial boundary comprises a bounding box, and wherein the intermediate structure comprises a middle-field structure.

16. The device of claim 11, wherein the one or more virtual objects comprise one or more of an invisible virtual mirror, an invisible virtual light, or an invisible glossy plane.

17. The device of claim 11, wherein the 3D scene of the video further comprises one or more real objects.

18. The device of claim 11, wherein the object type is one of a light, a camera, or other object.

19. The device of claim 11, wherein, to determine the illumination contribution, the processor is configured to:

determine a visibility for each plane of said spatial boundary for emissive objects; and determine color information for each plane of said spatial boundary for non-emissive objects.

20. A device for rendering a 3D scene of a video, comprising:

at least one processor, configured to:

identify a set of parameters for one or more virtual objects in a 3D scene of a video, wherein the set of parameters comprises an object planarity, an object refractivity, or an object importance in the 3D scene of the video;

determine a spatial boundary of an intermediate structure for each of the one or more virtual objects in the 3D scene based on a respective object type and a respective object importance weight parameter;

determine an illumination contribution for each plane of the spatial boundary of the intermediate structure for each of the one or more virtual objects in the 3D scene; and generate the 3D scene of the video based on the determined spatial boundary and the determined illumination contribution for each plane of the spatial boundary of the intermediate structure for each of the one or more objects in the 3D scene.

* * * * *